(12) United States Patent
Berner et al.

(10) Patent No.: US 11,463,637 B2
(45) Date of Patent: Oct. 4, 2022

(54) VISION SENSOR, A METHOD OF VISION SENSING, AND A DEPTH SENSOR ASSEMBLY

(71) Applicant: Sony Advanced Visual Sensing AG, Schlieren (CH)

(72) Inventors: Raphaël Berner, Confignon (CH); Marc Osswald, Zurich (CH)

(73) Assignee: SONY ADVANCED VISUAL SENSING AG, Schlieren (CH)

( * ) Notice: Subject to any disclaimer, the term of this patent is extended or adjusted under 35 U.S.C. 154(b) by 0 days.

(21) Appl. No.: 17/322,206

(22) Filed: May 17, 2021

(65) Prior Publication Data
US 2021/0274115 A1    Sep. 2, 2021

Related U.S. Application Data

(63) Continuation of application No. 16/838,179, filed on Apr. 2, 2020, now Pat. No. 11,012,646, which is a
(Continued)

(30) Foreign Application Priority Data

Mar. 14, 2016  (CH) ...................... 0337/16

(51) Int. Cl.
*H04N 5/365* (2011.01)
*H04N 5/363* (2011.01)
(Continued)

(52) U.S. Cl.
CPC ......... *H04N 5/363* (2013.01); *G01B 11/2513* (2013.01); *G01B 11/2518* (2013.01);
(Continued)

(58) Field of Classification Search
CPC ...... H04N 5/363; H04N 5/3745; H04N 5/365; H04N 5/37455; G01B 11/2513; G01B 11/2518
See application file for complete search history.

(56) References Cited

U.S. PATENT DOCUMENTS

| | | | |
|---|---|---|---|
| 4,339,745 A | 7/1982 | Barber et al. | |
| 4,503,508 A | 3/1985 | Brooks et al. | |

(Continued)

FOREIGN PATENT DOCUMENTS

| | | |
|---|---|---|
| DE | 101 25 307 | 8/2002 |
| DE | 103 01 598 | 3/2004 |

(Continued)

OTHER PUBLICATIONS

International Search Report of the International Searching Authority, dated May 29, 2017, from International Application No. PCT/IB2017/051421, filed on Mar. 10, 2017. 4 pages.
(Continued)

*Primary Examiner* — Hung H Lam
(74) *Attorney, Agent, or Firm* — HoustonHogle LLP

(57) ABSTRACT

According to the present invention there is provided a vision sensor comprising, an array of pixels comprising rows and columns of pixels, wherein each pixel in the array comprises, a photosensor which is configured to output a current proportional to the intensity of light which is incident on the photosensor; a current source which is configured such that it can output a current which has a constant current level which is equal to the current level of the current output by the photosensor at a selected first instant in time, and can maintain that constant current level even if the level of the current output from the photosensor changes after said selected first instant in time; an integrator which is configured to integrate the difference between the level of current output by the current source and the level of current output
(Continued)

by the photosensor, after the selected first instant in time; wherein the vision sensor further comprises a counter which can measure time, wherein the counter is configured such that it can begin to measure time at the selected first instant; and wherein each pixel in the array further comprises a storage means which can store the value on the counter at a second instant in time, the second instant in time being the instant when the integration of the difference between the level of current output by the current source and the level of current output by the photosensor of that pixel reaches a predefined threshold level. There is further provided a corresponding method of vision sensing, and a depth sensor assembly which comprises the vision sensor.

17 Claims, 10 Drawing Sheets

Related U.S. Application Data continuation of application No. 16/079,194, filed as application No. PCT/IB2017/051421 on Mar. 10, 2017, now Pat. No. 10,652,489.

(51) Int. Cl.
*G01B 11/25* (2006.01)
*H04N 5/3745* (2011.01)
*H04N 5/374* (2011.01)

(52) U.S. Cl.
CPC .......... *H04N 5/365* (2013.01); *H04N 5/3745* (2013.01); *H04N 5/37455* (2013.01)

(56) References Cited

U.S. PATENT DOCUMENTS

| | | | |
|---|---|---|---|
| 5,107,103 A | 4/1992 | Gruss et al. | |
| 5,282,061 A | 1/1994 | Farrell | |
| 5,303,027 A | 4/1994 | Kuderer et al. | |
| 5,488,415 A | 1/1996 | Uno | |
| 5,969,374 A | 10/1999 | Toh | |
| 6,285,778 B1 | 9/2001 | Nakajima et al. | |
| 7,385,708 B2* | 6/2008 | Ackerman | G01B 11/2536 356/603 |
| 8,493,496 B2 | 7/2013 | Freedman et al. | |
| 8,653,435 B2 | 2/2014 | Eldesouki | |
| 8,811,767 B2* | 8/2014 | Veeraraghavan | G06T 7/521 382/268 |
| 9,143,680 B2 | 9/2015 | Lee et al. | |
| 9,204,130 B2 | 12/2015 | Pawelski | |
| 10,282,857 B1* | 5/2019 | Brailovskiy | H04N 13/254 |
| 2003/0001080 A1 | 1/2003 | Kummaraguntla et al. | |
| 2012/0218464 A1 | 8/2012 | Ben-Moshe et al. | |
| 2015/0194454 A1 | 7/2015 | Kim et al. | |
| 2016/0033262 A1 | 2/2016 | Kessler et al. | |
| 2016/0353041 A1 | 12/2016 | Kim et al. | |
| 2017/0059305 A1* | 3/2017 | Nonn | G01B 11/2513 |

FOREIGN PATENT DOCUMENTS

| | | |
|---|---|---|
| EP | 0 553 406 | 8/1993 |
| EP | 1 657 910 | 5/2006 |
| WO | WO 2007085942 | 8/2007 |

OTHER PUBLICATIONS

Written Opinion of the International Searching Authority, dated May 29, 2017, from International Application No. PCT/IB2017/051421, filed on Mar. 10, 2017. 9 pages.

International Preliminary Report on Patentability, dated Sep. 18, 2018, from International Application No. PCT/IB2017/051421, filed on Mar. 10, 2017. 10 pages.

* cited by examiner

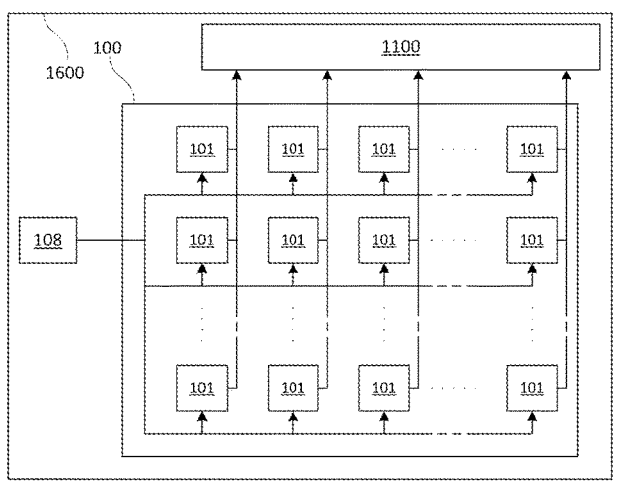 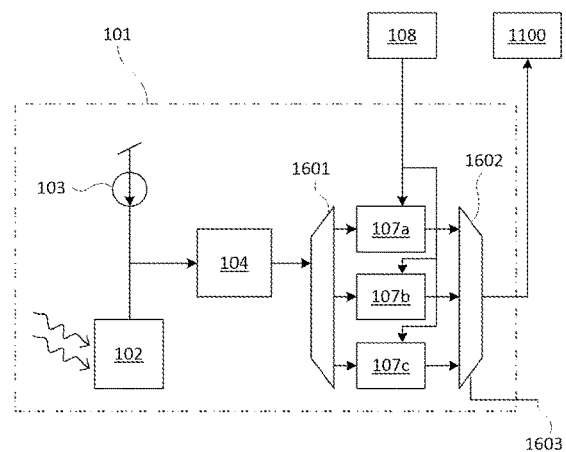
Figure 16A.                     Figure 16B.

VISION SENSOR, A METHOD OF VISION SENSING, AND A DEPTH SENSOR ASSEMBLY

RELATED APPLICATIONS

This application is a Continuation of U.S. patent application Ser. No. 16/838,179, filed on Apr. 2, 2020, which is a Continuation of U.S. patent application Ser. No. 16/079,194, filed on Aug. 23, 2018, now U.S. Pat. No. 10,652,489, issued Feb. 14, 2019, which is a § 371 National Phase Application of International Application No. PCT/IB2017/051421, filed on Mar. 10, 2017, which claims priority to Swiss Application No. 0337/16, filed on Mar. 14, 2016, all of which are incorporated herein by reference in their entirety.

FIELD OF THE INVENTION

The present invention concerns a vision sensor comprising, a counter and an array of pixels, wherein each pixel in the array comprises, a photosensor, a current source, an integrator and a storage means which can store the value on a counter when an output of the integrator reaches a predefined threshold. There is further provided a method of vision sensing and a depth sensor assembly which uses the vision sensor.

BACKGROUND TO THE INVENTION

Three-dimensional vision is an important requirement for a variety of interesting machine vision applications; for example self-driving cars, autonomous robots, augmented reality devices, entertainment systems, gesture recognition, face tracking or 3D modelling.

Ranging devices such as lidars or time-of-flight cameras require sub-nanosecond resolution to measure the time an emitted light pulse travels to a surface and back. These kind of measurements demand expensive setups either involving moving parts (lidar) or very complex and big pixel circuits (time-of-flight).

Passive vision systems, such as stereo vision or structure-from-motion overcome these limitations but require substantial computational resources and are only functional in environments with sufficient lighting and spatial contrast.

Active vision systems, based on structured lighting on the other hand, combine the advantages of an active light source with the simple data acquisition of a vision system.

In Active vision systems depth from structured lighting is obtained in the following way: A well-known pattern is projected on to a scene. The reflections of the pattern are captured by a camera which is mounted with a fixed baseline distance to the projector. Geometrical constraints (epipolar geometry) and the captured position of a projected pattern feature allow inferring the depth of the underlying surface. In order to obtain dense depth maps, many small projected features are required. To identify these features they should either be unique such as in the case of random dot patterns (e.g. Microsoft's Kinect) or multiplexed in time (e.g. Intel's Realsense or laser line scanners). However disadvantageously, the pattern of unique features limit the spatial resolution and require computationally expensive matching algorithms, and time-multiplexed patterns are constrained by the temporal resolution of the sensor and can suffer from motion artefacts if the temporal resolution of the sensor is not sufficiently large compared to the motion captured in the scene.

It is an aim of the present invention to mitigate at least some of the above-mentioned disadvantages.

BRIEF SUMMARY OF THE INVENTION

According to the invention, these aims are achieved by means of a vision sensor, comprising,
  an array of pixels comprising rows and columns of pixels, wherein each pixel in the array comprises, a photosensor which is configured to output a current proportional to the intensity of light which is incident on the photosensor; a current source which is configured such that it can output a current which has a constant current level which is equal to the current level of the current output by the photosensor at a selected first instant in time, and can maintain that constant current level even if the level of the current output from the photosensor changes after said selected first instant in time; an integrator which is configured to integrate the difference between the level of current output by the current source and the level of current output by the photosensor, after the selected first instant in time;
  wherein the vision sensor further comprises a counter which can measure time, wherein the counter is configured such that it can begin measure time at the selected first instant, and
  wherein each pixel in the array further comprises a storage means which can store the value on the counter (i.e. the time measure on the counter, referred to hear after as the 'counter value') at a second instant in time, the second instant in time being the instant when the integration of the difference between the level of current output by the current source and the level of current output by the photosensor of that pixel reaches a predefined threshold level.

Advantageously the vision sensor of the present invention is optimized for time-multiplexed structured lighting depth estimation that allows to minimize motion artefacts and to reduce the computational complexity.

Advantageously the vision sensor of the present invention achieves a high signal-to-noise ratio by in-pixel background subtraction using a configurable current source and precise temporal resolution by in-pixel illumination change detection.

A vision sensor may further comprise a processor which is configured such that it can receive the counter value from each pixel in the array, and is configured to use the received counter value to generate a depth map.

The storage means of pixels in the same column may be connected such that counter values stored in the storage means of a pixel may be passed to the storage means of the adjacent pixel.

The storage means may comprise a shift register. The shift register may comprise one or more flip-flops.

The vision sensor may further comprise a read-out circuit for outputting the counter values stored in the storage means of one or more pixels in the array to a processor which is configured to use the counter values to generate a depth map.

The read-out circuit may comprise a bus which can be sequentially connected to the storage means of each pixel in the array and is connected to the processor, so that counter values stored in the storage means of the pixels can be sequentially output to the processor across the bus.

In one embodiment the storage means of pixels in the same column in the array are connected such that counter values stored in the storage means of a pixel may be passed to the storage means of the adjacent pixel, and wherein the read-out circuit comprises a plurality of column circuits each of which is configured to receive a counter value from the storage means of a pixel and to output the received counter value to the processor, wherein a column circuit is provided for each column in the array of pixels such that the number of column circuits correspond to the number of columns in the array of pixels, and wherein each column circuit is directly connected to a single storage means of a single pixel in a corresponding column, and wherein the counter values stored in the storage means of other pixels in said column can be passed consecutively to the column circuit via the storage means of the pixel to which that column circuit is directly connected.

The read-out circuit may comprise a plurality of column circuits each of which is configured to receive a counter value from the storage means of pixels in a corresponding column, and to output the received counter value to a processor, wherein a column circuit is provided for each column in the array of pixels such that the number of column circuits correspond to the number of columns in the array of pixels, and wherein for each pixel in each column a switch is provided between the storage means of the pixel and the corresponding column circuit for that column, such that each column circuit can be selectively, directly, connected to the storage means of any of the pixel in a corresponding column by closing the switch for that pixel; and wherein the read-out circuit further comprises a row-select circuit which can select a row of pixels whose stored counter values are to be output to the processor, by selectively closing the switches for pixels along a row of the array, such that the storage means of each pixel along said row is directly connected to respective corresponding column circuits, so that each corresponding column circuit can simultaneously receive the counter values stored in the storage means of the pixels located in a selected row, and subsequently output the received counter values to the processor.

The column circuit may comprise a shift register which can receive counter values stored in the storage means of the pixels in the array, and can sequentially output the received counter values to a processor configured to use the counter values to generate a depth map.

The photosensor may comprise a photodiode or phototransistor.

The photosensor may comprise a photodiode and a cascode NMOS transistor, wherein an output of the photodiode is connected to the source of the NMOS transistor, and the drain of the NMOS transistor defines the output of the photosensor.

The photosensor may further comprise an inverting amplifier, wherein the gate of the NMOS transistor is connected to an output of the inverting amplifier and an input of the inverting amplifier is connected to an output of the photodiode.

The integrator may comprise a capacitor which can integrate the difference between the level of current output by the current source and the level of current output by the photosensor, after the selected first instant in time.

The integrator may comprise a comparator which determines if the difference between the level of current output by the current source and the level of current output by the photosensor has crossed said predefined threshold.

The comparator may be implemented using an amplifier.

The integrator may comprise a capacitor and wherein, an output of the current source and an output of the photosensor are connected to a node, and the capacitor is connected between said node and ground, and wherein the node is further connected to a first input of the amplifier, and wherein the a voltage source, which can define said threshold level, is connected to a second input of the amplifier.

In an embodiment said capacitor is defined by parasitic capacitances of the current source, photosensor and amplifier at said node.

The vision sensor may further comprise a second amplifier, wherein the second amplifier is located between current source and the comparator. The second amplifier may be a capacitive amplifier comprising an inverting amplifier and two capacitors.

The current source of each pixel in the array may comprise a PMOS transistor.

In an embodiment the gate of the PMOS transistor is selectively connected to an output of the amplifier by means of a switch which is located between the gate of the PMOS transistor and an output of the amplifier, wherein the switch is closed at the first instant in time to cause the current source to output a current which has a constant current level which is equal to the current level of the current output by the photosensor, and wherein the switch is open between said first instant in time and second instant in time.

In an embodiment the current source further comprises a cascode PMOS transistor, wherein the drain the PMOS transistor is connected to the source of the cascode PMOS transistor and the drain of the cascode PMOS transistor defines the output of the current source.

The vision sensor may further comprise a clock which is connected to the counter so that the clock can provide a clock signal to the counter, wherein the clock signal defines the rate at which the counter counts.

The counter may be a binary counter which is configured to output a binary number which is representative of a counter value.

The counter may be a gray counter which if configured to output a gray code.

According to a further aspect of the present invention there is provided a method of vision sensing the method comprising the steps of, for one or more pixels in an array of pixels, (a) sampling background illumination the pixel at a first time instant;

(b) after the first time instant, integrating the difference between the sampled background illumination and a current illumination of said pixel;

(c) measuring the time between the first time instant and a second time instant when the integral of the difference between the sampled background illumination and the current illumination of said pixel reaches a predefined threshold level.

The method may further comprise the step of, for each of said one or more pixels, storing the counter value in a storage means of the pixel.

The method may further comprise the steps of, for each of said one or more pixels, outputting the counter value to a processor; and at the processor, generating a depth map using the counter values.

The steps of outputting the counter values to a processor and generating a depth map using the counter values, may comprise, outputting a binary number which is representative of the counter value, and generating the depth map at the processor using said binary number.

The method may further comprise the step of, using the vision sensor according to any one of claims 1-26 to perform the steps (a)-(c).

The step (a) may comprise identifying the current which is output from the photosensor at the first time instant, and configuring the current source so that it outputs a current with a constant current level which is equal to the current level of the current output by the photosensor at the first time instant, and maintaining that constant current level until the second time instant at least, even if the level of the current output from the photosensor changes after the first time instant.

The step (b) may comprise integrating the difference between the current output from the photosensor and the current output by the current source.

The step of determining the difference between the sampled background illumination and a current illumination of said pixel, may comprise determining the difference between the level of current output by the current source and the level of current output by the photosensor.

In an embodiment of the method of vision sensing said current source of each pixel in the array comprises a PMOS transistor, and said integrator comprises a comparator which determines if the difference between the level of current output by the current source and the level of current output by the photosensor has crossed a predefined threshold: and an output of the current source and an output of the photosensor are connected to a node, and the capacitor is connected between said node and ground, and wherein the node is further connected to a first input of the comparator, and wherein the a voltage source, which can define said threshold level, is connected to a second input of the comparator; and wherein the gate of the PMOS transistor of the current source is selectively connected to an output of the comparator by means of a switch which is located between the gate of the PMOS transistor and an output of the comparator; and wherein the method comprises the step of defining said threshold level by, before the first time instant, closing the switch and providing a first voltage to the second input of the comparator; at the first time instant, opening the switch and providing a second voltage to the second input of the comparator; wherein the difference between the first voltage and second voltage defines the threshold level.

In an embodiment of the method of vision sensing the storage means of adjacent pixels in the same column in the array are connected, and the method further comprises the step of passing the counter value which is stored in the storage means of a pixel to the storage means of an adjacent pixel located in the same column, so that the counter values stored in the storage means of pixels in the same column of the array can be outputted consecutively to a processor.

The method may further comprise the step of selecting a row of pixels whose stored counter values are to be output to the processor, and simultaneously outputting the counter values stored in the storage means of all pixels in the selected row to a column circuit which is configured to output the received counter values to a processor.

According to a further aspect of the present invention there is provided a depth sensor assembly (200) comprising,
a projector (201); and
a camera (202) which comprises the vision sensor (1) according to any one of the above-mentioned vision sensor embodiments.

BRIEF DESCRIPTION OF THE DRAWINGS

The invention will be better understood with the aid of the description of an embodiment given by way of example and illustrated by the figures, in which:

FIG. 16A illustrates a vision sensor according to a further embodiment of the present; FIG. 16B illustrates the features of each pixel the array or pixels, where each pixel comprises multiple memories.

DETAILED DESCRIPTION OF POSSIBLE EMBODIMENTS OF THE INVENTION

Figure 1A:
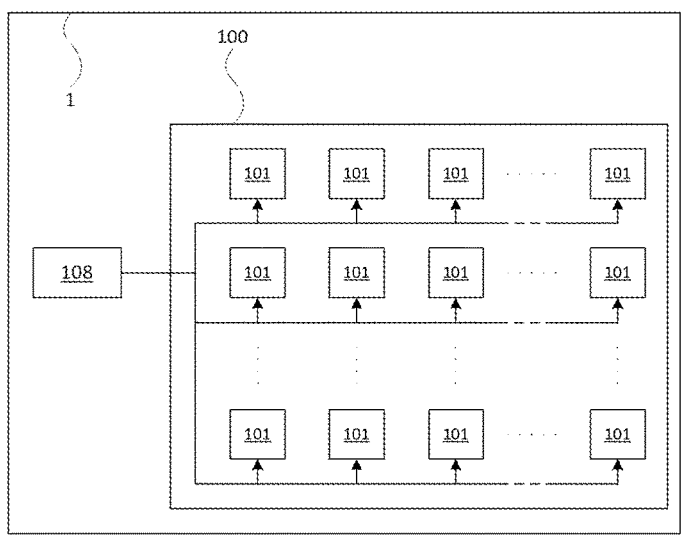
FIG. 1A illustrates a vision sensor according to an embodiment of the present invention.

FIG. 1A illustrates a vision sensor 1 according to an embodiment of the present invention.

The vision sensor 1 comprises an array of pixels 100 comprising rows and columns of pixels 101.

Figure 1B:
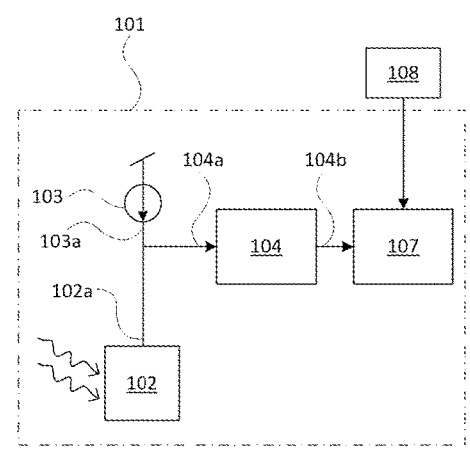
FIG. 1B illustrates the features of each pixel the array or pixels.

FIG. 1B illustrates the features of each pixel 101 the array or pixels. As shown in FIG. 1B, each pixel in the array comprises, a photosensor 102 which is configured to output, at an output 102a of the photosensor 102a, a current proportional to the intensity of light which is incident on the photosensor;

a current source 103 which is configured such that it can output, at an output 103a of the current source, a current which has a constant current level which is equal to the current level of the current output by the photosensor at a selected first instant in time, and can maintain that constant current level even if the level of the current output from the photosensor changes after said selected first instant in time;

an integrator 104 which is configured to integrate the difference between the level of current output by the current source and the level of current output by the photosensor, after the selected first instant in time.

Referring back to FIG. 1A, the vision sensor further comprises a counter 108. The counter is configured such that it can begin to count (at a predefined rate), at a selected first instant in time. In this embodiment each pixel in the pixel array is connected to the counter such that each pixel can read the value on the counter. Preferably, the counter is a binary counter. In the preferred embodiment the counter is a gray counter. The output of a gray counter is a gray code, which is a binary code where two successive values differ in only one bit.

Referring again to FIG. 1B, each pixel in the array further comprises a storage means 107, in this embodiment the storage means in each pixel is a memory 107. Each pixel can store the value of the counter 108 in its respective memory 107 at a second time instant, the second time instant being a time instant when the integration of the difference between the level of current output by the current source and the level of current output by the photosensor of that pixel reaches a predefined threshold level.

The integrator 104 has an input 104a and an output 104b. The output 102a of the photosensor 102 is connected to the input 104a of the integrator 104; the output 103a of the current source 103 is also connected to the input 104a of the integrator 104. The output 104b of the integrator 104 is connected to the memory 107.

During use, preferably at said selected first instant in time the respective current sources 103 of all of the pixels 101 in the pixel array 100 are configured to output a current equal to the current output by their respective photosensors 102; the respective current sources 103 are configured to maintain an output at constant current equal to the current output at the selected first instant in time. In each pixel 101 the respective integrator 104 will integrate the difference between the constant current output by the current source 103 and the current output by the photosensor 102 (the current output of the photosensor will change depending on the amount of light incident on the photosensor). At a second instant in time, the integral of the difference between the constant current output by the current source and the level of current output by the photosensor of that pixel reaches a predefined threshold level and the value on the counter 108 is stored in the memory/storage means 107 of that pixel; it should be understand that this may occur at different times in each pixel in the pixel array, but the second instant in time may be the same or different for each pixel in the pixel array. At a selected third instant in time, the content of the memory/storage means 107 of a pixel may be read-out to a processor; most preferably a the selected third instant in time, the content of the respective memory/storage means 107 of every pixel 101 in the pixel array is read-out to a processor.

For ease of understanding a time span before and including the selected first instant in time shall be called the reset phase, the time between the selected first instant in time and the selected third instant in time shall be called integration phase, and the time between the selected third instant in time until the content of all memory/storage means 107 has been read shall be called readout phase. The ensemble of reset phase, integration phase and readout phase shall be called a frame.

Figure 2A:
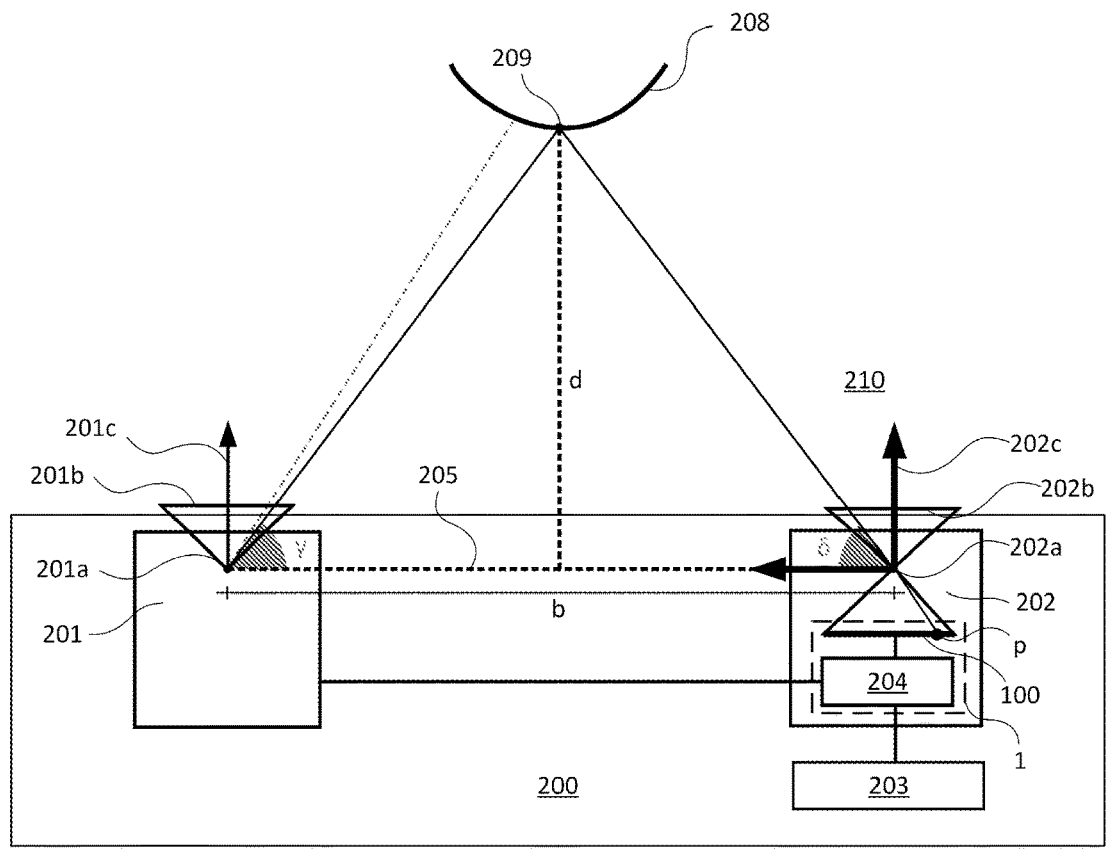
FIG. 2A illustrates a depth sensor assembly which uses the vision sensor of FIG. 1A.

FIG. 2A illustrates the vision sensor 1 of FIG. 1A-B in use. Specifically FIG. 2A shows a depth sensor assembly 200 which comprises a projector 201 and a camera 202, which comprises the vision sensor 1 of FIG. 1A-B. The vision sensor 1 further comprises a processor 204. The depth sensor assembly 200 further comprises a memory 203. The processor 204 is connected to the projector 201 and to the pixel array 100 of the vision sensor 1. Specifically, the processor 204 is connected to the memory 107 of each pixel 101 in the pixel array 100 so that counter values stored in the memory 107 of each pixel can be selectively read out to the processor 204.

The projector 201 is configured to project electromagnetic rays (herein after referred as light rays) in a spectrum, on a surface 208; the light rays may be reflected by the surface 208 and may be captured by the camera 202. I should be noted that the light rays may be invisible to the human eye e.g. infrared or ultraviolet light rays.

The projector 201 may be modelled using a pinhole model in which all light rays projected by the projector 201 pass through a single point or may be extrapolated to pass through a single point; said single point defines the optical centre 201a of the projector 201. If the projector uses a lens (e.g. a beamer), the according pinhole model may be derived using structured-light projector calibration methods known in the art. If the projector contains one or multiple other lens-free light sources (e.g. a laser), the projector may be configured such that all projected light rays pass through a single point or may be extrapolated to pass through a single point which corresponds to the optical centre 201a of the projector 201. The virtual image plane 201b of the pinhole model of the projector 201 is oriented perpendicular to the principal axis 201c of the projector 201 and is located at a distance from optical centre 201a of the projector 202 which is modelled as the focal length (f) of the projector 201.

Equivalently, the camera 202 may be modelled using a pinhole model in which all light rays indecent on the camera 202 pass through a single point or may be extrapolated to pass through a single point; said single point defines the optical centre 202a of the camera 202. The virtual image plane 202b of the pinhole camera model of the camera 202 is oriented perpendicular to the principal axis 202c of the camera 202 and is located at a distance from optical centre 202a of the camera 202 which is equal to the focal length (f) of the camera 202.

The light rays which are projected by the projector 201, and which are subsequently incident on the vision sensor 1 of the camera 202 (e.g. light rays which are projected by the projector 201 and are reflected by a surface 208 towards the vision sensor 1 of the camera 202, so that they are incident on the vision sensor 1 of the camera 202) may be modelled as an image on the virtual image plane 201b of the pinhole model of the projector; said image on virtual image plane 201b is referred to hereinafter as the projection image.

Calibration techniques known in the art can be used to find the pinhole model of camera 202 including the optical centre 202a of the camera 202, the principal axis 202c of the camera 202, focal length (f) of the camera 202 and the virtual image plane 202b of the camera 202.

The projector 201, and camera 202 are positioned at a fixed position and orientation relative to one another. The baseline 205 is a reference line which intersects both the optical centre 201a of the projector 201 and the optical centre 202a of the camera 202.

Since the projector 201, and camera 202 are at a fixed position relative to one another, the distance between the optical centre 202a of the projector 201 and the optical centre 202a of the camera 202 is also fixed. The baseline distance between the optical centre 202a of the projector 201 and the optical centre 202a of the camera 202 is denoted in FIG. 2A as 'b'. The baseline distance 'b' between the optical centre 202a of the projector 201 and the optical centre 202a of the camera 202 can be determined using techniques known in the art.

The light which a respective pixel receives when the projector 201 is not projecting light onto the surface 208 is referred hereafter as the "background illumination". At a first instant in time, before the projector 201 is operated to project any light rays onto the surface 208, each pixel in the vision sensor 1 is operated to sample their respective background illumination (i.e. each pixel 101 is operated to sample the intensity of the light which is incident on the pixel before the projector 201 is operated to project light). In each pixel, in order to sample their background illumination, the current source 103 in the pixel is configured to output a current which has a constant current level which is equal to the current level of the current output by the photosensor 102. Preferably, also at the first instant in time before the projector 201 is operated to project any light onto the surface 208 the counter 108 is set to a starting value (e.g. 'zero'). The current source 103 is set to maintain said constant current level.

Once each pixel 101 has sampled their respective background illuminations and the counter 108 has been set to a starting value, the projector 201 is then operated to project light rays onto a surface 208 so as to form a projected light pattern on the surface 208. At least some of the projected light rays will be reflected by the surface 208. The projector 201 and camera 202 are orientated such that at least some of the projected light rays which are reflected by the surface 208 will be incident on one or more of the pixels 101 in the pixel array 100 of the vision sensor 1 in the camera 202.

After the first instant in time, when the projector 201 begins to project light rays onto a surface 208 to form a projected light pattern, the counter 108 is initiated to begin counting from its starting value. Also at the instant the projector 201 begins to project light rays onto a surface 208 to form a projected light pattern, the integrators 104 of the respective pixels 101 in the pixel array 100 will begin to integrate the difference between the level of current output by the current source 103 and the level of current output by the photosensor 102 of that pixel. It should be understood that the current source 103 in the pixel maintains a constant current output from when the background illumination was sampled, but the current output by the photosensor 102 of that pixel will vary depending on the light incident on the pixel; typically the current output by the photosensor 102 will increase when the projector 201 projects light onto the surface 208 as some of the light will be reflected from the surface 208 and will be incident on the pixels in the pixel array.

It will be understood that the projected light pattern may take any suitable form; for example, the projected light pattern may be a line (such as a vertical line), or, a random dot pattern.

In the most preferred embodiment the pixels 101 in the pixel array 100 lie on a single plane; the projector 201 and camera 202 are positioned relative to one another, such that: the baseline 205 (i.e. the line which intersects both the optical centre 201a of the projector 201 and the optical centre 202a of the camera 202) is perpendicular to a principal axis 202c of the camera 202 and is parallel to the single plane on which all pixels 101 in the pixel array 100 lie, and is aligned with one of the two coordinates of the pixel array 100, and such that the baseline 205 and the principal axis 202c of the camera lie on the same plane (hereinafter referred as the baseplane 210). It should be noted that in FIG. 2A, the baseplane 210 is parallel to the plane of the page.

Figure 2B:
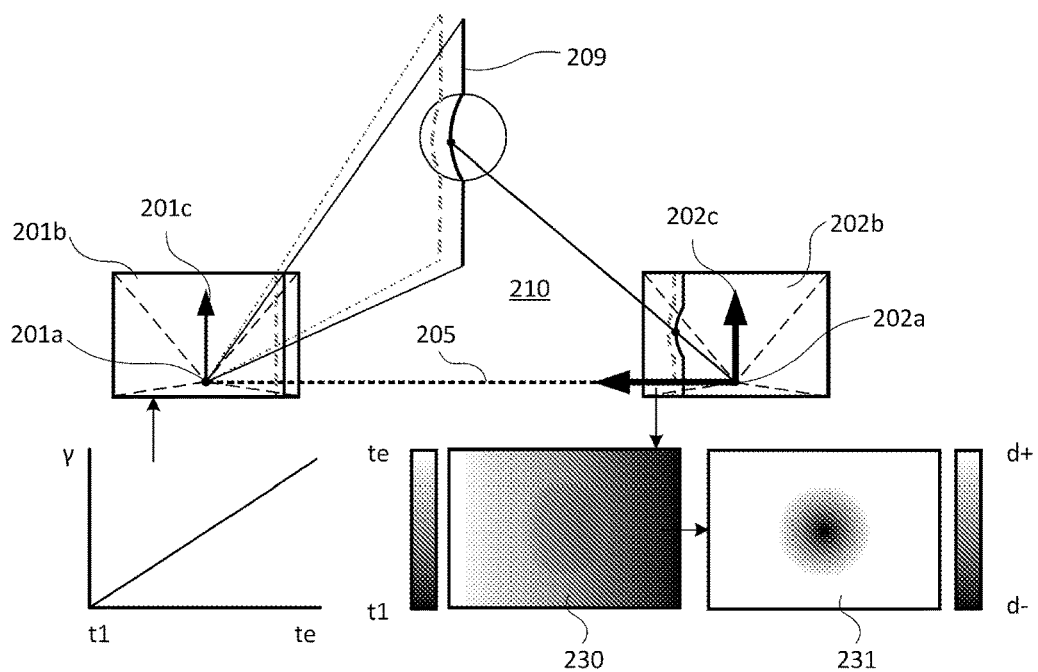
FIG. 2B shows the resulting depth map which can be produced using the depth sensor assembly of FIG. 2A.

In this example, the projector 201 projects a plurality of light rays which define a line of light on the surface 208, (i.e. the projector 201 projects a plurality of light rays which define a line pattern of light on the surface 208); in this example shown in FIGS. 2A-B, the baseline 205 has a horizontal orientation in space, and the projector 201 projects a vertical line 209 onto the surface 208 (i.e. the projected line 209 is perpendicular to the baseline 205).

To project a line of light on the surface 208 the projector 201 projects a plurality of light rays all of which lie on a single plane (hereinafter referred as the line projection plane). The projected line 209 shall be oriented such than the line projection plane is perpendicular to the baseplane 210; the angle between the baseline 205 and the line projection plane is referred to hereafter as projection angle $\gamma$. The projection angle $\gamma$ may be increased or decreased over time in order to scan the projected line pattern across the surface 208.

If the projected pattern is a vertical line that is perpendicular to the baseplane 210 as in the most preferred embodiment, then (assuming a pinhole model for the camera 202) the corresponding epipolar lines on the virtual image plane 202b of the camera 202 will run horizontally and parallel to one another. This allows to unambiguously assign a captured point in the camera to an epipolar plane which would not be possible if the epipolar lines would cross in the field of view of the camera.

As mentioned in the example illustrated in FIG. 2A, the projector 201 is configured to project a vertical line 209 onto the surface 208; the projection angle ($\gamma$) of the projector 201 is increased (over time) to scan that vertical line 209 across the surface 208 (i.e. $\gamma=f(t)$) so that, ideally, every point on the surface 208 will have received a light ray which was projected by the projector at some point in time. It should be noted that the projection angle ($\gamma$) is the angle which the line projection plane (i.e. the plane on which all of the plurality of light rays which form the vertical line lie) forms with the base line 205. Importantly, since the plurality of projected light rays define a vertical line 209, each of the plurality of projected light rays will all lie on the same line projection plane, thus each of the plurality of projected light rays will each form the same angle with the base line 205, and thus each of the plurality of projected light rays will have the same projection angle ($\gamma$).

It should be noted that in this embodiment the projected pattern is fixed; in other words at each projection angle ($\gamma$) at which the projector 201 projects, the same vertical line 209 pattern will be projected (although the appearance of the projected pattern on the surface 208 will depend on whether the surface 208 is flat or contoured).

Specifically, in this embodiment shown in FIG. 2A, at a first known time instant the light rays which define the vertical line 209 on the surface 208 are projected at a known, initial, predefined projection angle (γ). Then the projection angle (γ) is increased at a known, predefined rate; specifically, in this example the projection angle (γ) is increased a predefined amount each time the counter value increases by a predefined amount (i.e. each time the value of the counter 108 in the vision sensor 1 increases by a predefined amount); thus, projection angle (γ) is proportional to the counter value on the counter 108. For example the known, initial, predefined projection angle may be '0' degrees and the projection angle may be increased '1' degree per counter increment; thus the projection angle (γ) of the plurality of projected light rays which define the vertical line 209 on the surface 208, is equal to the counter value; or initial, predefined projection angle may be '0' degrees and the projection angle (γ) may be increased '2' degrees per counter 108 increment; thus the projection angle (γ) of the plurality of projected light rays which define the vertical line 209 on the surface 208, is double the counter value.

A formula defining the projection angle (γ) as a function of counter value is stored in the memory 203.

When the projector 201 projects the vertical line 209 on the surface 208 at least some of the projected light rays will be reflected by the surface 208. At least some of the projected light rays which are reflected by the surface 208 will be incident on one or more of the pixels 101 in the pixel array 100 of the vision sensor 1 in the camera 202.

In the example illustrated in FIG. 2A, at the first known time instant the light rays, which define the fixed pattern (vertical line), are projected at the initial, known, predefined projection angle (γ), onto the surface 208; some of those projected light rays will be reflected by the surface 208 and will be incident on one or more pixels 101 in the pixel array 100. The projection angle (γ) will be then increased, and the projector 201 will project light rays, which define the fixed pattern (vertical line), onto a different position of the surface 208; some of those projected light rays will be reflected by the surface 208 and will be incident on one or more other pixels 101 in the pixel array 100 etc.

When a pixel 101 in the pixel array 100 receives a reflected light ray this will drive the integration value i.e. the integration of the difference between the level of current output by the current source 103 (which is the constant level to which is was set during the background sampling) and the level of current output by the photosensor 102 of that pixel 101 over the predefined threshold level and the counter value (i.e. the value on the counter 108) will be saved in the memory 107 of that pixel 101. Thus the counter value stored in the memory 107 of the pixel 101 corresponds to when a reflected light ray was incident on that pixel 101.

In the pinhole camera model, a reflected light ray which is incident on a pixel 101 in the pixel array 100 must have a specific spatial direction (in other words each pixel 101 in the pixel array 100 can only receive reflected light rays which have a single specific spatial direction (said single specific spatial direction will be different for each pixel 101 in the pixel array 100); reflected light rays which do not have said single specific spatial direction will not be incident on the pixel). The respective specific spatial direction for each respective pixel 101 in the pixel array is a three-dimensional direction; the three-dimensional direction can be projected onto the baseplane 210, and the angle which said projected direction forms with the baseline 205 defines an inclination angle (δ) for that pixel.

Thus, the inclination angle (δ) for a respective pixel 101 in the pixel array 100 is the angle which, the projection of a reflected light ray onto the baseplane 210 must form with the baseline 205, in order for said reflected light ray to be incident on said pixel 101. The inclination angle (δ) of the pixel 101 is dependent on the position of the pixel 101 within the pixel array 100, and position and orientation of the camera 202. In this embodiment the orientation and position of the camera is fixed, therefore the respective inclination angles (δ) of each pixel 101 in the pixel array 100 are fixed.

In one embodiment the inclination angle (δ) of each pixel 101 in the pixel array 100 is determined in a calibration step and the respective inclination angle (δ) of each pixel 101 is stored in the memory 203.

In the most preferred embodiment (as well as in the case of a calibrated camera with a principal axis 202c perpendicular to the baseline 205, the inclination angle (δ) of a pixel 101 in the pixel array 100 is determined using the following formula:

$$\delta = \frac{\pi}{2} - \tan^{-1}\left(\frac{d_x}{f}\right)$$

Wherein f is the focal length of the camera 202, and $d_x$ is the axis intercept of the axis along the baseplane 210 in a pixel direction vector $d_{uv}$ connecting the optical centre of the calibrated camera to the according pixel on the virtual image plane 202b. Since in the most preferred embodiment, the x-axis coordinate of the direction vector is parallel to the baseplane 210 and since the principal axis 202c is perpendicular to the baseline, the projection of the direction vector onto the baseplane 210 is equivalent to the x component $d_x$ and the z component f of the direction vector.

The pixel direction vector $d_{uv}$, for a given a point on the virtual image plane 202b with coordinates u and v, is represented as follows:

$$d_{uv} = \begin{bmatrix} d_x \\ d_y \\ f \end{bmatrix}$$

The pixel direction vector $d_{uv}$ is determined using the following formula:

$$d_{uv} = K^{-1} \text{Undistort}(p)$$

Wherein p is the position of the respective pixel 101 in the pixel array 101, and K is the "camera intrinsic matrix" so $K^{-1}$ is the inverse of the "camera intrinsic matrix":

$$p = \begin{bmatrix} u \\ v \\ 1 \end{bmatrix}, K = \begin{bmatrix} f'_u & s & c_u \\ 0 & f'_v & c_v \\ 0 & 0 & 1 \end{bmatrix}$$

Wherein p is represented in homogeneous coordinates.

Wherein with respect to the entries in the "camera intrinsic matrix" K, the metric focal length f is measured in meters, the intrinsic calibration focal length f' is measured in pixel dimensions such that f'=f/(lp), whereas lp is the size of a pixel in the vision sensor 1 measured in meters along the u- and v-coordinates (noted by the according subscripts); and wherein s is a skew parameter and $c_u$ and $c_v$ are coordinates of the principal point. The entries in the "camera intrinsic matrix" K are preferably obtained in a calibration step in which the intrinsic parameters of the camera are determined using known techniques.

And wherein Undistort( ) is an image undistortion function which compensates distortion effects such as the radial lens distortion or the tangential distortion in the camera 201. The undistortion function may be numerically approximated using the distortion parameters obtained in a calibration step in which the intrinsic parameters of the camera are determined using known techniques. The undistortion function is preferably determined in a calibration step using known techniques.

After the vertical line 209 has been scanned across the surface 208 (i.e. after the projector 201 has projected the vertical line 209 at a final, maximum, projection angle), the respective counter values which are stored in the respective memories 107 of each of respective pixel 101 in the pixel array 100 are read out to the processor 204.

The processor 204 generates a counter image using said counter values. FIG. 2B illustrates an exemplary counter image 230 which the processor 204 may generate; the counter image 230 is a matrix containing all of said counter values which were stored in the respective memories 107 of the respective pixels 101, and wherein the position of each counter value in the matrix corresponds to the position of the respective pixel 101 in the pixel array 100. In FIG. 2B the counter values range from the lowest counter value t1 to the highest counter value te.

For each of the respective counter values which is provided in the counter image 230, the processor 204 determines a respective depth value d using the following formula:

$$d = b \frac{\tan(\gamma) \cdot \tan(\delta)}{\tan(\gamma) + \tan(\delta)}$$

wherein the depth value d is the distance between, the point on the surface 208 at which the reflected light ray which was incident on the pixel 101 (i.e. the pixel from whose memory 107 said counter value in question was read out) was reflected, and the baseline 205 measured along the principal axis 202c of the camera 202; $\delta$ is the inclination angle ($\delta$) for said pixel 101 (i.e. the pixel from whose memory 107 said counter value in question was read out); and $\gamma$ is the projection angle ($\gamma$) of the plurality of light rays projected by the projector 201 which define the vertical line 209, at time the counter 108 had a counter value corresponding to the counter value which was read out from the memory 107 of said pixel (the projection angle ($\gamma$) may be computed using the formula defining the projection angle ($\gamma$) as a function of counter value which is stored in the memory 203); and 'b' is the baseline distance between the optical centre 202a of the projector 201 and the optical centre 202a of the camera 202.

It should be understood that in the embodiment in which the inclination angle ($\delta$) of each pixel 101 is determined in a calibration step and the respective inclination angle ($\delta$) of each pixel 101 is stored in the memory 203, the processor 204 may simply retrieve the inclination angle ($\delta$) for the respective pixel 101 (i.e. the pixel from whose memory 107 said counter value in question was read out) from the memory 203. In another embodiment, the processor 204 may determine the inclination angle ($\delta$) for the respective pixel 101 (i.e. the pixel from whose memory 107 said counter value in question was read out) using the formulae described earlier in the description.

The baseline distance 'b' between the optical centre 202a of the projector 201 and the optical centre 202a of the camera 202, can be calculated using known techniques in the art, and is typically calculated in a calibration step and it subsequently stored in the memory 203. Thus the baseline distance 'b' can be retrieved by the processor 204 from the memory 203.

As mentioned, the projection angle ($\gamma$) of the plurality of light rays projected by the projector 201 and which define the vertical line 209 on the surface 208, for any counter value (i.e. for any of the respective counter values which were read out from the memories 107 of respective pixel 101 in the pixel array 100) can be determined using the formula defining the projection angle ($\gamma$) as a function of counter value which is stored in the memory 203. The processor 204 retrieves from the memory 203 said formula defining the projection angle as a function of counter value; for each pixel, the processor enters the counter value which was read out from the memory 107 of said pixel into the formula to determine the projection angle ($\gamma$) of the plurality of light rays projected by the projector 201 which defined the vertical line 209 on the surface 208, at the time when the counter 108 had a counter value corresponding to the counter value which was read out from the memory 107 of said pixel.

Thus for each of the respective counter values which is provided in the counter image 230, the processor 204 can determine a respective depth value d using the following formula:

$$d = b \frac{\tan(\gamma) \cdot \tan(\delta)}{\tan(\gamma) + \tan(\delta)}$$

The processor 204 then generates a depth map 231 using all of said determined depth values d. FIG. 2B illustrates a depth map 231; the depth map 231 is a matrix containing all of said determined depth values d, and wherein the position of each depth value d in the matrix corresponds to the position of the corresponding counter value in the counter image 230 from which that respective depth value d was determined. In the depth map 231 of FIG. 2B the depth values shown are in a range between the minimal distance d- and the maximal distance d+.

In the above-mentioned embodiment, the projector 201 projects a vertical line 209 onto the surface 208 and the projection angle ($\gamma$) is increased at a predefined rate to scan that vertical line 209 across the surface 208. In another embodiment, as will be now described, instead of projecting a vertical line 209, a light pattern which comprises a plurality of distinct features (geometric primitives or combinations, such as dots, edges or lines) may be projected onto the surface 208; said light pattern is such that the corresponding epipolar lines of the projected features which define the light pattern on the surface 208, do not overlap or cross within the field of view of the camera 202. For any feature captured by the camera, said projected pattern allows establishing an unambiguous correspondence with a projected feature using epipolar geometry and therefore said projected pattern shall be referred to hereinafter as an unambiguous pattern.

The vertical line projected in FIG. 2A-B is one of many possible unambiguous patterns given the projector 201 and the camera 202 are arranged horizontally.

For the highest triangulation accuracy, the projected features would ideally be infinitesimally narrow but limitations in the projector and the camera result in features that cover a certain area when projected onto a surface 208. Therefore, each feature shall be associated with an anchor point that allows to associate features, that may span multiple pixels in the pixel array, with a distinct point. For a projected dot, said anchor point may be its centre.

To determine an unambiguous pattern, the process of stereo image rectification known in the art is applied. Hereby the fact that in rectified images, the epipolar lines run parallel along one of the two image coordinates (the u* coordinate) is exploited:

Step 1. Calibrate the intrinsic camera calibration parameters of the projector 201 and the camera 202 using projector and camera calibration procedures known in the art. Calibrate the extrinsic camera calibration parameters using stereo calibration methods known in the art. Compute the projective transformations needed for the image rectification from the camera coordinates to the rectified coordinates using rectification methods known in the art.

Step 2. Compute the inverse to the projective transformations and the inverse of the undistortion function (wherein the undistortion function is obtained in a camera calibration step using known methods). Note that the inverse to the radial component of the undistortion function (a polynomial function) must be numerically approximated.

Step 3. Chose a suitable light pattern such that only one distinct visual feature, such as a dot, line or edge, in the rectified projection pattern is present per v* coordinate, wherein v* refers to the rectified image coordinate perpendicular to the epipolar lines.

Step 4. Apply the inverse of the projective transformation of the projector, obtained in Step 2, to the rectified projection pattern. Then apply the inverse to the undistortion function, obtained in Step 2, to obtain the unambiguous pattern that shall be projected.

Most preferably steps 1-4 will be carried out a plurality of times to determine a plurality of different unambiguous patterns.

For the computation of the depth map, the data acquisition is similar to the procedure described with respect to FIGS. 2A and B.

The light which a respective pixel receives when the projector 201 is not projecting light onto the surface 208 is referred hereafter as the "background illumination". Initially, before the projector 201 is operated to project any light rays onto the surface 208, each pixel in the vision sensor 1 is operated to sample their respective background illumination (i.e. each pixel 101 is operated to sample the intensity of the light which is incident on the pixel before the projector 201 is operated to project light). In each pixel, in order to sample their background illumination the current source 103 in the pixel is configured to output a current which has a constant current level which is equal to the current level of the current output by the photosensor 102. Preferably, also initially, before the projector 201 is operated to project any light onto the surface 208 the counter 108 is set to a starting value (e.g. 'zero'). The current source 103 is set to maintain said constant current level.

Once each pixel 101 has sampled their respective background illuminations and the counter 108 has been set to a starting value, the following steps are performed:

Step A. Project, using the projector 201, a first unambiguous pattern (obtained by carrying out steps 1-4), onto the surface 208. The first unambiguous pattern which was projected is stored in the memory 203 (or a parametrized form of the first unambiguous pattern is stored in the memory 203) together with the value of the counter 108 at the time instant when the projector 201 projected said first unambiguous light pattern; wherein the first unambiguous pattern is stored in the memory 203 in association with the value of the counter 108.

At the instant the projector 201 first begins to project the first unambiguous pattern the counter 108 is initiated to begin counting from its starting value. Also at the instant the projector 201 begins to project first unambiguous pattern, the integrators 104 of the respective pixels 101 in the pixel array 100 will begin to integrate the difference between the level of current output by the current source 103 and the level of current output by the photosensor 102 of that pixel. It should be understood that the current source 103 in the pixel maintains a constant current output from when the background illumination was sampled, but the current output by the photosensor 102 of that pixel will vary depending on the light incident on the pixel; typically the current output by the photosensor 102 will increase when the projector 201 projects light onto the surface 208 as some of the light will be reflected from the surface 208 and will be incident on the pixels in the pixel array.

When the projector 201 projects the first unambiguous pattern (obtained by carrying out steps 1-4), onto the surface 208, at least some of the projected light rays will be reflected by the surface 208. The projector 201 and camera 202 are orientated such that at least some of the projected light rays which are reflected by the surface 208 will be incident on one or more of the pixels 101 in the pixel array 100 of the vision sensor 1 in the camera 202.

When a pixel 101 in the pixel array 100 receives a reflected light ray this will drive the integration value (i.e. the integration of the difference between the level of current output by the current source 103 (which is the constant level to which is was set during the background sampling) and the level of current output by the photosensor 102 of that pixel 101 over the predefined threshold level and the counter value (i.e. the value on the counter 108) will be saved in the memory 107 of that pixel 101. Thus, the counter value stored in the memory 107 of the pixel 101 corresponds to when a reflected light ray was incident on that pixel 101.

Step B. After the value on the counter 108 has increase by a predefined amount, then project a second unambiguous pattern (e.g. by moving or rotating the previous pattern or by creating a new pattern according to the procedure to create an unambiguous pattern) onto the surface 208. Preferably the second unambiguous pattern will be incident on different areas of the surface 208 to which the first unambiguous pattern was incident so that different areas of the surface 208 are illuminated compared to when the first unambiguous pattern was projected. Store the second unambiguous light pattern in the memory 203 (or a parametrized form of the second unambiguous pattern) together with the value of the counter 108 at the time instant when the projector 201 projected said second unambiguous pattern; wherein the second unambiguous pattern is stored in the memory 203 in association with said value of the counter 108.

Step C. Preferably, repeat step B a plurality of times, each time projecting a different respective unambiguous pattern (e.g. repeat step B four more times, respectively projecting a third, fourth, fifth, sixth unambiguous pattern etc.) until a predefined spatial and temporal resolution of the data acquired by the vision sensor 1 is achieved. It should be noted that step B and C are optional, it is sufficient for the invention that only the first unambiguous pattern is projected.

Step D. After the respective unambiguous pattern has been projected by the projector 201, the respective counter values which are stored in the respective memories 107 of each of respective pixel 101 in the pixel array 100 are read out to the processor 204. The processor 204 generates a counter image using said counter values (similar to the counter image 230 shown in FIG. 2B); the counter image is a matrix containing all of said counter values which were stored in the respective memories 107 of the respective pixels 101, and wherein the position of each counter value in the matrix corresponds to the position of the respective pixel 101 in the pixel array 100. The counter image is then rectified using the projective transformation derived from the calibration steps for the stereo rectification known in the art to provide a rectified counter image.

Step E. For each pixel in the rectified counter image perform following steps:
   a. Determine whether a counter value has been stored, otherwise skip the pixel. (there will be no counter value stored in a pixel if that pixel has not received sufficient light to allow the integration by the integrator 104 of that pixel to reach the predefined threshold; this will be the case for example, if after the plurality of different respective unambiguous patterns have been projected, that no reflected light ray has been incident on that pixel)
   b. Determine if any neighbouring pixels (i.e. pixels which are adjacent to the pixel) contain the same counter value; identifying clusters of pixels, each cluster composed of a plurality of adjacent pixels each of which comprise the same counter value (each cluster may comprise one or more pixels).
   c. Compute the anchor point $p_c^*$ (in rectified camera coordinates) of the feature associated with said cluster of pixels (that may just contain a single pixel). E.g. for a projected dot, determine the centre of said cluster of pixels
   d. Identify the counter value common to said cluster of pixels (that may contain one or more pixels); retrieve from the memory 203 the unambiguous pattern which is associated in the memory 203 with said identified counter value.
   e. If the unambiguous pattern is not stored in its rectified form, rectify the pattern.
   f. Determine the rectified coordinate $v_c^*$ (which is perpendicular to the epipolar lines) of the anchor point $p_c^*$ to search the according epipolar line of the unambiguous pattern for the corresponding projected feature and its associated anchor point $p_p^*$.
   g. Use the coordinates u* along the rectified epipolar lines of the points associated with the projected and the captured feature to compute the disparity. The disparity can then be used to compute the depth d according to:

$$d = \frac{bf}{disparity} = \frac{bf}{u_p^* - u_c^*}$$

wherein dis the depth (distance between point on surface and baseline measured along the direction of the principal axis of the camera), and 'b' is the baseline distance between the optical centre 202a of the projector 201 and the optical centre 202a of the camera 202, f is the focal length of the camera 202, and $u_p^*$ and $u_c^*$ are the rectified coordinates along the epipolar lines of a appoint associated with a distinct feature in the rectified projection image and the rectified camera image.

The processor then generates a depth map using all of said determined depth values d. The depth map is a matrix containing all of said determined depth values d, and wherein the position of each depth value din the matrix corresponds to the position of the corresponding pixel in the rectified camera image.

In the above embodiment, the projector 205 is configured to project a series of unambiguous patterns (such as a series of dot patterns), each pattern in the series formed by light rays. The patterns within the series of patterns are such that the corresponding epipolar lines within the camera do not cross or overlap within the captured camera images. In another embodiment, the series of unambiguous patterns are such that after the series has been projected, every point on the surface 208 preferably will have received a light ray which was projected by the projector at some point in time. Advantageously, this embodiment allows high spatial resolution i.e. allows to determine the distance from many points on the surface 208 to the baseline 205.

In another embodiment, the series of unambiguous patterns are such that after the series has been projected, only some points on the surface 208 will have received a light ray which was projected by the projector. While this embodiment achieves lower spatial resolution it advantageously allows to quickly compute the distance from some points on the surface 208 to the baseline 205.

In another embodiment, the series of unambiguous patterns are such that after all of the patterns in the sequence have been projected, the respective counter values which are stored in the respective memories 107 of each of respective pixel 101 in the pixel array 100 are read out to the processor 204.

In yet a further embodiment the projected pattern (or the patterns in a series of projected patterns) are not constrained in any way with respect to their corresponding epipolar geometry at the camera (e.g. said light pattern may be such that the corresponding epipolar lines of the projected features which define the light pattern on the surface 208 do overlap or cross within the field of view of the camera 202):

For example, in one further embodiment the projector 201 projects a random feature pattern (such as the random dot patterns used in Kinect V1) onto the surface 208; the random feature pattern is modulated in intensity, moved or projected in a series of random feature patterns such that the pixels 101 in the camera 202 are exposed to increased illuminations that trigger the storage of the counter value. Due to the fact that even in the rectified projection pattern multiple features per epipolar line are present, ambiguities for matching counter values in the counter image captured by the camera 202 to projected features arise. To resolve these ambiguities, spatial cues and local correlations on the relative distribution of the features may be used. So instead of matching individual features along the epipolar lines, sets of features are matched. The methods used for establishing said correlations may follow the methods outlined in U.S. Pat. No. 8,493,496 B2.

In another example, the projector 201 projects a pattern that comprises of a sequence of one-dimensional masks arranged in a two-dimensional pattern that may be used to compute the depth with increasingly complex masks (such as the binary search tree patterns in the Intel RealSense). Starting off with an unambiguous mask, the matching of the projected and captured image of the mask may for subsequent masks be constrained and therefore simplified. The according projector may follow US 20120218464 A1.

It should be noted that the steps described in any of the embodiments described in this application, could be repeated one or a plurality of times so as to achieve a plurality of depth maps.

It should be noted that in any of the embodiments described in this application the counter value of the counter 108 may be digital value. In one embodiment, the digital value of the counter 108 is stored in the memory 107 of the pixel 101 when the integration value (i.e. the integration of the difference between the level of current output by the current source 103 (which is the constant level to which is was set during the background sampling) and the level of current output by the photosensor 102 of that pixel 101) is equal to or greater than the predefined threshold level. In another embodiment, the counter value is converted to an analogue value which is representative of the digital counter value of the counter; and that analogue value is stored in the memory 107 of the pixel. The analogue value may be converted back to a digital value before is it read out the processor 204. Advantageously storing an analogue value which is representative of the digital counter value requires less pixel area than storing a digital counter value.

Advantageously, as can be derived from the exemplary embodiments described above, the use of a vision sensor 1 according to the present invention provides a depth map which can be updated at a high frame rate. The frame rate depends directly on the sensor's temporal resolution. In other words, because the vision sensor can detect a change in light intensity (i.e. a change in the intensity of light incident on the pixels in the pixel array) relative to the background illumination, at a high time resolution, the frame rate of the depth map can be high.

Advantageously, in the present invention, most of the computations for the depth computation are very simple and fast. No matching or searching steps are required. The inclination angles for each of the pixels 101 in the pixel array 100 may be pre-computed and stored in the memory 203 (in the form of look-up tables for example). Also in the present invention, the computation of the projection angles is simplified (e.g. using a known initial projection angle, and a known rate of increase of projection angle).

By projecting patterns for which the epipolar lines do not cross or overlap within the captured camera images (i.e. unambiguous patterns such as a vertical line pattern), the underlying matching of projected and received points is simple and unambiguous. It works even with complex surfaces and does not require any assumptions on the continuity of the surface.

Advantageously, by providing storage means integral to each respective pixel enables accurate recording of the value on the counter at the time instant when the integration value (as determined by the integrator) of that respective pixel, reaches the predefined threshold. In particular, it enables accurate recording of the value on the counter at the time instant when the integration value (as determined by the integrator) of that respective pixel, reaches the predefined threshold, even if a plurality of the pixels in the pixel array simultaneously reach the predefined threshold. The ability to accurately record the value on the counter at the time instant when the integration value (as determined by the integrator) of that respective pixel, reaches the predefined threshold, allows to more rapidly alternate projected predefined pattern over the surface S, and thereby acquire the depth map faster. The advantages of acquiring the depth map faster are that it reduces motion artefacts and allows having a high update rate on the depth map.

Additionally, integrating the difference between the background illumination and the instantaneous illumination of the pixel, in each respective pixel in the pixel array (i.e. using respective integrators which are integral to respective pixels), allows operation to be independent of ambient illumination, thus, there is reduced risk of the pixels in the pixel array becoming saturated.

Furthermore, in one embodiment, the projector can be configured to project a plurality of different predefined patterns; a user will select one of the plurality of different predefined patterns for the projector to project. Also, a plurality of different predefined thresholds is provided; the user will select one of the plurality of predefined thresholds. Most preferably the user will select one of the plurality of predefined thresholds depending on the predefined pattern which the projector is to project (e.g. a first predefined threshold is used if the projector is to project a first predefined pattern, and a second predefined threshold is used if the projector is to project a second predefined pattern); the possibility to select different predefined thresholds for different projection patterns, allows a good signal-to-noise ratio without the need to use a multi-bit analogue to digital converter.

It should be understood that a switch may be in two states. In a first state the two terminals of the switch are electronically connected which is hereinafter referred as closed and in a second state the two terminals are not electronically connected which is hereinafter referred as open. An electronical connection may be implemented as direct electronic connection that allows electrons to flow from one terminal to the other. Alternatively an electronical connection may be implemented using voltage buffers.

Figures 4A, 4B:
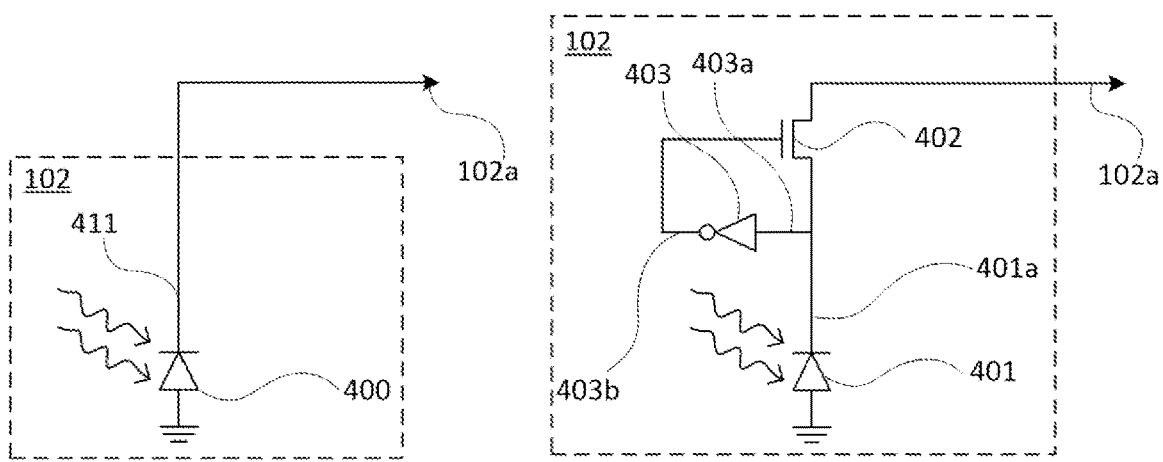
FIG. 4A-B illustrates two exemplary configurations of photosensor that may be used in each pixel of the vision sensor.

It should be understood that the photosensor 102 provided in each pixel 101 of the pixel array 100 of the vision sensor 1 of FIG. 1A, may take any suitable configuration. As shown in FIG. 1B, the photosensor 102 comprises an output 102a. FIGS. 4A and 4B provide two exemplary implementations of the photosensor in each pixel.

Referring to FIG. 4A, the photosensor 102 comprises a photodiode 400; an output 411 of the photodiode defines the output 102a of the photosensor.

Referring to FIG. 4B the photosensor 102 comprises a photodiode 401, a cascode NMOS transistor 402 and an inverting amplifier 403. The photodiode 401 has an output 401a, and the inverting amplifier 403 has an input 403a and an output 403b. The output 401a of the photodiode 401 is connected to both the source of cascode NMOS transistor 402 and also to the input of the inverting amplifier 403. The gate of cascode NMOS transistor 402 is connected to the output of the inverting amplifier 403. The drain of the cascode NMOS transistor 402 defines the output 102a of the photosensor 102.

Figures 5A, 5B:
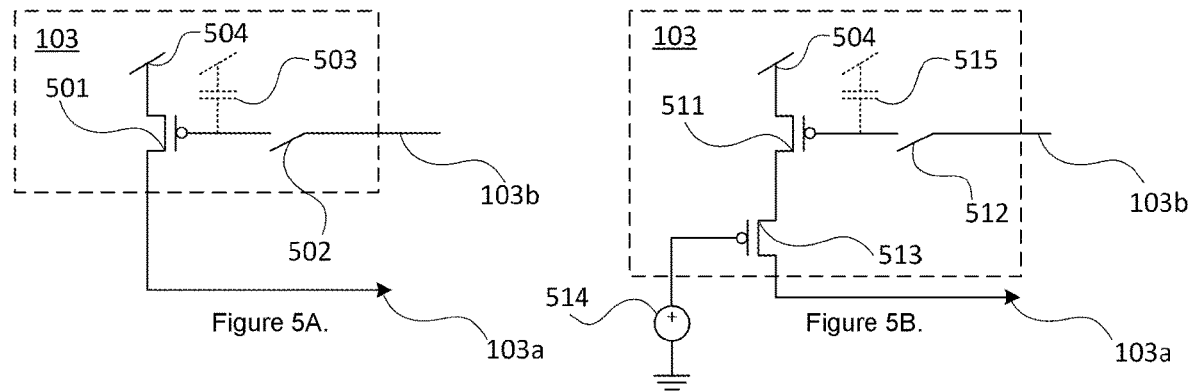
FIG. 5A-B illustrates two exemplary configurations of current sources that may be used in each pixel of the vision sensor.

It should be understood that the current source 103 provided in each pixel 101 of the pixel array 100 of the vision sensor 1 of FIG. 1A, may take any suitable configuration. As shown in FIG. 1B, the current source 103 comprises output 103a. FIGS. 5A and 5B provide two exemplary implementations of the current source 103 in each pixel 101.

Referring to FIG. 5A, the current source 103 comprises a PMOS transistor MP1 501, a switch 502 and a capacitor 503. The capacitor is connected between the gate of the PMOS transistor 501 and the power supply 504. The capacitor 503 may be explicit or may be the parasitic capacitance of the gate of the PMOS transistor 503. The switch 502 is located between the gate of the PMOS transistor MP1 501 and an input 103b that is used to configure the current source. The switch 502 may be selectively put in a closed state to electronically connect the gate of the PMOS transistor MP1 501 and the input 103b; or the switch 502 may be put in an open state to provide an open circuit between the gate of the PMOS transistor MP1 501 and the input 103b, which allows to set the current output to a constant level.

When the pixels 101 of the pixel array 100 used in the depth sensor 200 of FIG. 2A for example have a current source as depicted in FIG. 5A, then a signal (Reset) which is provided by the processor 204 is used to control the state of the switch 502; specifically the processor 204 provides a signal (Reset) which controls the state of the switch 502 which puts the switch 502 in a closed state or open state. In the current source 103 shown in FIG. 5A the drain of the PMOS transistor MP1 defines the output 103a of the current source 103.

During the reset phase, the switch 502 is configured to be in the closed state, during the integration phase, the switch is configured to be in the open state.

Referring to FIG. 5B, the current source 103 comprises a PMOS transistor 511, a switch RS 512, a cascode PMOS transistor 513 and a capacitor 515. The capacitor is connected between the gate of the PMOS transistor 511 and the power supply. The capacitor 515 may be explicit or may be the parasitic capacitance of the gate of the PMOS transistor 515. The switch RS 512 is located between the gate of the PMOS transistor MP1 511 and an input 103b of the current source that is used to configure the current source 103. The switch RS may be put in a closed state to electronically connect the gate of the PMOS transistor MP1 511 and the input 103b; or the switch RS may be put in an open state to provide an open circuit between the gate of the PMOS transistor MP1 511 and the input 103b.

When the pixels 101 of the pixel array 100 used in the depth sensor 200 of FIG. 2A for example contain a current source according to FIG. 5B, then a signal (Reset) which is provided by the processor 204 is used to control the state of the switch 502 such that the background illumination is sampled before projecting the first light pattern. Specifically the processor 204 provides a signal (Reset) which controls the state of the switch 502. During the reset phase, the switch is configured to be in the closed state to sample the background illumination, during the integration phase, the switch is configured to be in the open state.

The gate of the cascode PMOS transistor 513 is connected to a voltage source 514. The drain of PMOS transistor 511 is connected to the source of the cascode PMOS transistor 513. The drain of the cascode PMOS transistor 513 defines the output 103a of the current source 103.

As shown in FIG. 1B the output 103a of the current source 103 is connected to the output 102a of the photosensor 102 and to the input 104a of the integrator 104.

It should be understood that the integrator 104 provided in each pixel 101 of the pixel array 100 of the vision sensor 1 of FIG. 1A, may take any suitable configuration. FIGS. 6 to 9 provide example implementations for the integrator 104 in each pixel 101.

Figure 6:
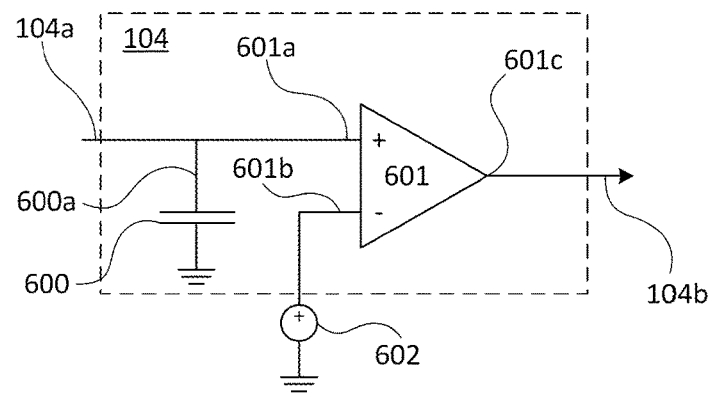
FIG. 6 illustrates an exemplary configuration of an integrator that may be used in each pixel of the vision sensor; the integrator shown in FIG. 6 comprises of a capacitor and an amplifier.

Referring to FIG. 6, the integrator 104 comprises a capacitor 600 having a first terminal and second terminal; and an amplifier 601. The first terminal of the capacitor 600 is connected to ground and the second terminal 600a is connected to the first input 601a of the amplifier 601 and also defines the input 104a of the integrator so that the capacitor 600 can integrate the difference in the current output from the current source 103 and current output from the photosensor 102. The capacitor 600 may be explicit or may be a parasitic capacitance of the circuit elements connected to the input of the integrator 104a. The second input 601b of the amplifier 601 is connected to a voltage source 602. During the reset phase, the voltage source 602 supplies a first voltage level Vreset to the second input of the amplifier 601. During the integration phase, the voltage source 602 is set to a second voltage level, so that the voltage source 602 supplies a second voltage level to the second input of the amplifier 602; the second voltage level may be lower than the first voltage level. The difference between the first voltage level Vreset and the second voltage level defines said predefined threshold level. The output 601c of the amplifier 600 defines the output 104b of the integrator.

Figure 7:
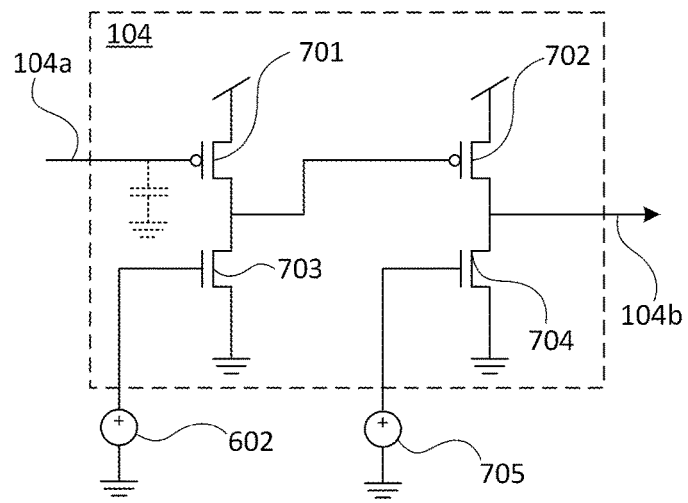
FIG. 7 illustrates an exemplary configuration of an integrator that may be used in each pixel of the vision sensor; the integrator shown in FIG. 7 comprises a two-stage common source amplifier.

Referring to FIG. 7 which shows yet a further possible implementation for the integrator 104; in this example the integrator 104 comprises a two-stage common source amplifier. The integrator 104 comprises a first stage having a first PMOS transistor 701 and a first NMOS transistor 703; and a second stage having a second PMOS transistor 702 and a second NMOS transistor 704; the gate of first NMOS transistor 703 of the first stage is connected to a voltage source 602, the gate of the second NMOS transistor 704 is connected to a bias voltage 705. The gate of the first PMOS transistor 701 defines the input 104a of the integrator 104. The parasitic capacitance of the first PMOS transistor 701 is used to integrate the difference in the current output from the current source 103 and current output from the photosensor 102 (i.e. is equivalent to the capacitor 600 of the implementation shown in FIG. 6). The drain of the first PMOS transistor 701 is connected to the drain of the first NMOS transistor 703 and to the gate of the second PMOS transistor 702. The drain of the second PMOS transistor 702 is connected to the drain of the second NMOS transistor 704. The node between the drain of the second PMOS transistor 702 and the drain of the second NMOS transistor 704 defines the output 104b of the integrator 104.

Figure 8:
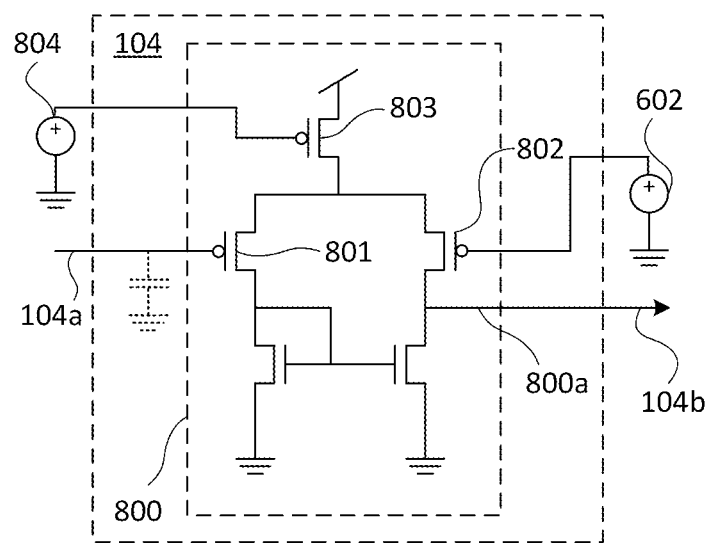
FIG. 8 illustrates an exemplary configuration of an integrator that may be used in each pixel of the vision sensor; the integrator shown in FIG. 8 comprises an 5-transistor operational transconductance amplifier.

Referring to FIG. 8 which shows yet a further possible implementation for the integrator 104; in this example the integrator 104 comprises a five-transistor operational transconductance amplifier (OTA) 800. The gate of the first input transistor 801 defines the input 104a of the integrator. The gate of the second input transistor 802 is connected to the voltage source 602. The gate of the bias transistor 803 is connected to a bias voltage source 804. The output 800a of the OTA 800 defines the output 104b of the integrator 104.

Figure 9:
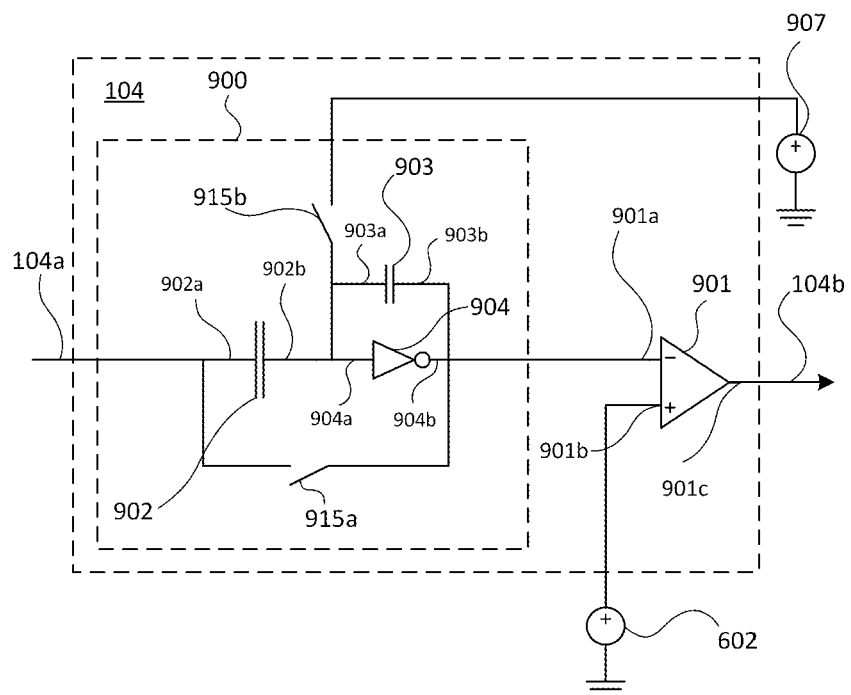
FIG. 9 illustrates an exemplary configuration of an integrator that may be used in each pixel of the vision sensor; the integrator shown in FIG. 9 comprises a capacitive amplifier and a comparator.

Referring to FIG. 9 which shows yet a further possible implementation for the integrator 104; in this example the integrator 104 comprises a capacitive amplifier 900 and a comparator 901. The comparator 901 comprises a first and second input 901a, 901b and comprises an output 901c. The capacitive amplifier 900 comprises of a first capacitor 902 comprising a first and second terminal 902a, 902b, a second capacitor 903 comprising a first and second terminal 903a, 903b, an inverting amplifier 904 having an input 904a and an output 904b, a first switch 915a and a second switch 915b. The first terminal 902a of the first capacitor 902 defines the input 104a of the integrator, and the second terminal 902b of the first capacitor 902 is connected to the input 904a of the inverting amplifier 904. The first terminal 903a of the second capacitor 903 is connected to the second terminal 902b of the first capacitor 902, and the second terminal 903b of the second capacitor 903 is connected to the output 904b of the inverting amplifier 904. The output 904b of the inverting amplifier 904 is connected to the first input 901a of the comparator 901. The second input 901b of the comparator 900 is connected to a first voltage source 602. The output 901c of the comparator 901 defines the output 104b of the integrator 104.

The first switch 915a is connected between the first terminal 902a of the first capacitor 902 and the output 904b of the inverting amplifier 904. The second switch 915b is connected between the input 904b of the inverting amplifier 904 and a second voltage source 907. The first and second switch 915a,b are configured to be closed during the reset phase, and are configured to be open during the integration phase.

Figure 3:
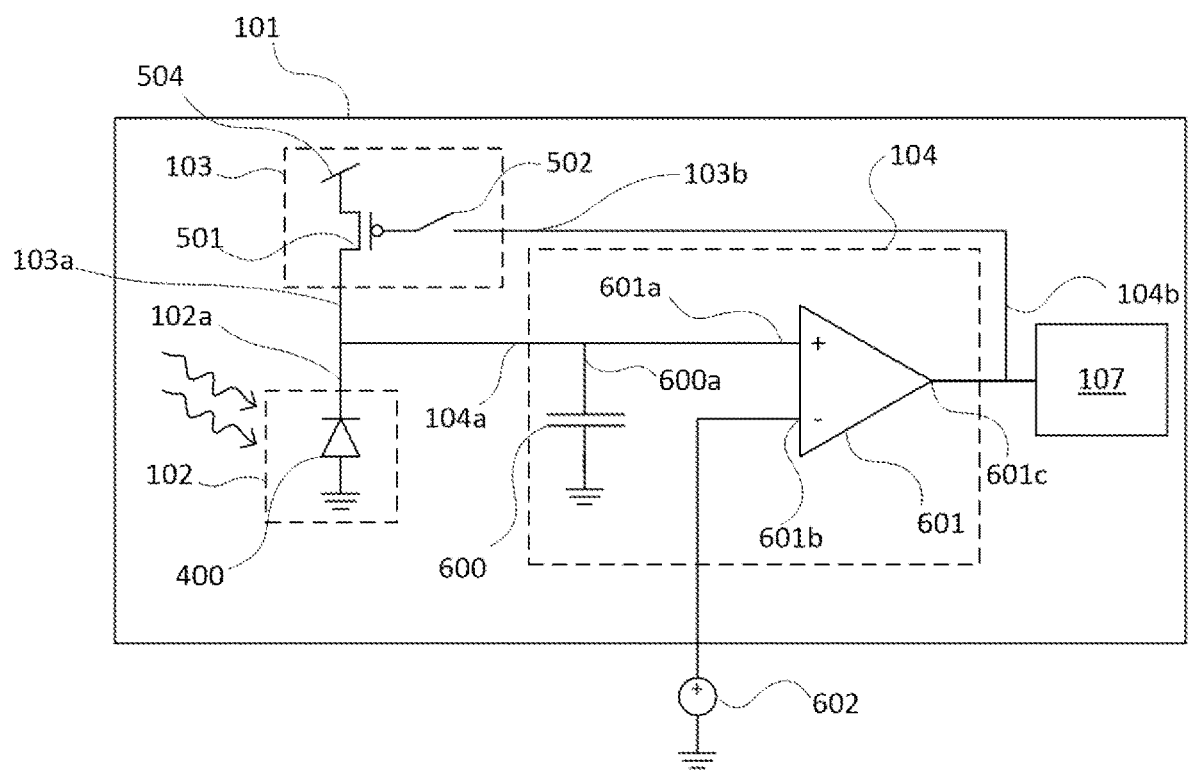
FIG. 3 illustrates the preferred configuration of a pixel used in the vision sensor.

It should be understood that each pixel 101 of the pixel array 101 of the vision sensor 1 of FIG. 1A, may take any suitable configuration. FIG. 3 illustrates the preferred configuration of a pixel 101; it should be understood that each pixel 101 in the pixel array 100 of the vision sensor 1 may be configured as illustrated in FIG. 3.

The pixel 101 shown in FIG. 3 comprises a photosensor 102 which is implemented as a photodiode 400, and a current source 103 which is implemented as a PMOS transistor 501 with the source connected to a power supply 504 and the drain connected to the output 102a of the photosensor 102.

The integrator 104 comprises an amplifier 601 and a capacitor 600 that integrates the difference between the current output by the current source 103 (which is set to a constant at the first time instant) and the current output by the photosensor 102. The first terminal of the capacitor is connected to ground. The amplifier 601 has a first input 601a, a second input 601b and an output 601c. The first input 601a of the amplifier 601 is connected to the second terminal 600a of the capacitor and defines the input 104a of the integrator; and the second input 601b of the amplifier 601 is connected to a voltage source 602.

The capacitor 600 may be an explicit capacitor or the parasitic capacitances of the circuit elements connected to this node (which are the current source 103, the photosensor 102 and the first input 601a of the amplifier 601). The input 103b of the current source is connected to the output 104b of the integrator. When the pixels 101 of the pixel array 100 are used in the depth sensor 200 of FIG. 2A, then the state of the switch 502 may be controlled by a global signal (called Reset) which is provided by the processor 204.

Advantageously, if the input 103b of the current source 103 is connected to the output of the integrator 104b, configuring the current source so that it outputs a current with a constant current level which is equal to the current level of the current output by the photosensor at the first time instant is done through a feedback loop when the switch 502 is closed. This feedback loop (consisting of the amplifier 601, the current source and the photosensor) ensures that while the switch 502 is closed, the voltage at the first input 601a of the amplifier will approach the voltage at the second input 601b of the amplifier, which, during the reset phase, is set to a first voltage level Vreset by means of the voltage source 602.

The input 103b of the current source 103 may optionally be connected to the output 103a of the current source instead of the output of the integrator 104.

Advantageously, if the input 103b of the current source 103 is connected to the output 104b of the integrator, the feedback loop used for configuring the current source takes into account the offset voltage of the amplifier 601 and the threshold voltage mismatch of the PMOS transistor 501.

Advantageously, if the pixels in the pixel array of the vision sensor 1 each have the configuration shown in FIG. 3, the vision sensor 1 can detect an increase and/or decrease in the light intensity of a pixel.

It should be understood that the storage means 107 provided in each pixel 101 of the pixel array 100 of the vision sensor 1 of FIG. 1A, may take any suitable configuration. In the embodiment of FIG. 1A the storage means in each pixel 101 is a memory 107. The memory 107 may be implemented by means of a set of Flip-Flops or latches where the number of Flip-Flops per pixel is equal to the number of bits of the counter 108; or the memory may be implemented as an analogue memory such as a capacitor.

Figure 10A:
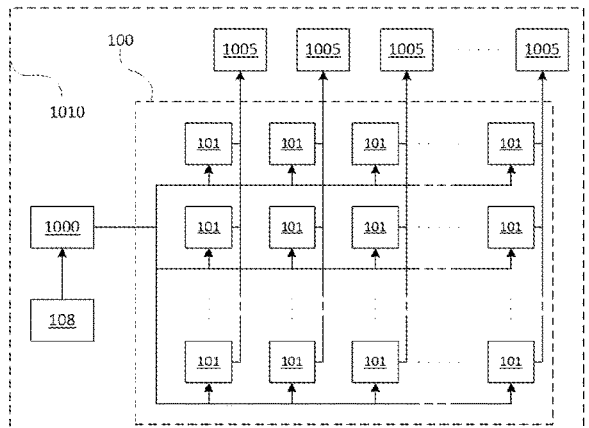
FIG. 10A illustrates a vision sensor according to a further embodiment of the present invention.
Figure 10B:
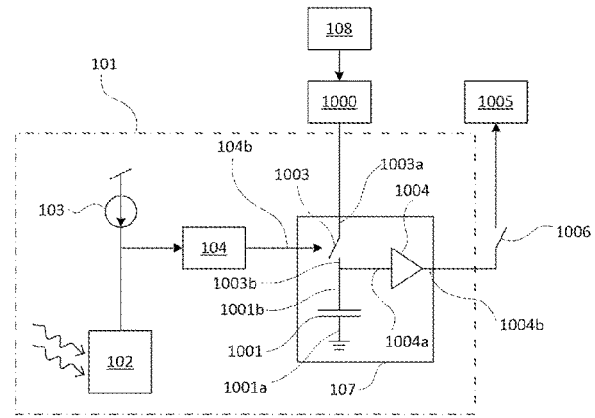
FIG. 10B illustrates the features of each pixel the array or pixels, each pixel using an analogue storage means.

FIG. 10A-B illustrates a vision sensor 1010 according to a further embodiment of the present invention. The vision sensor 1010 has many of the same features as the vision sensor 1 in FIGS. 1A, B and like features are awarded the same reference numbers.

The vision sensor 1010 further comprises a voltage digital-to-analogue converter (DAC) 1000, which is connected to the counter 108; the voltage digital-to-analogue converter (DAC) 1000 creates a voltage proportional to the value of the counter 108. This voltage which is created by the voltage digital-to-analogue converter (DAC) 1000 is distributed to all pixels 101 in the pixel array 100. The memory/storage means 107 of each pixel 101 in the pixel array 100 comprises a capacitor 1001 having a first electrode 1001a and second electrode 1001b, a switch 1003 having first terminal 1003a and second terminal 1003b, and a buffer 1004. The first electrode 1001a of the capacitor 1001 is connected to ground, the second electrode 1001b of the capacitor 1001 is connected to the first terminal 1003a of the switch 1003. The second terminal 1003b of the switch 1003 is connected to the voltage digital-to-analogue converter (DAC) 1000.

The state of the switch is controlled by the output 104b of the integrator 104: if the integral of the difference between the current output by the photosensor 102 and the constant current output by the current source 103 is below the predefined threshold, the switch 1003 is closed. As soon as the integral of difference between constant current output by the photosensor 102 and current output by the current source 103 reaches the predefined threshold, the integrator 104 outputs a signal at its output 104b which opens the switch 1003.

The second electrode 1001b of the capacitor 1001 is connected to an input 1004a of a buffer 1004. An output 1004b of the buffer 1004 of any pixel may be selectively connected to one of a set of analogue-to-digital converters (ADCs) 1005 by means of a switch 1006. For example there may be one ADC per column of pixels 101 in the array 100, and each pixel in this column may be selectively connected to a single analogue-to-digital converter (ADCs) 1005. The analogue-to-digital converters (ADCs) may be used to convert the voltage stored on capacitor 1001 of a pixel 100 to a digital value, which then corresponds to the counter value at the instant where in the corresponding pixel, the integral of difference between current output by the photosensor 102 and constant current output by the current source 103 reaches the predefined threshold.

Figure 11A:
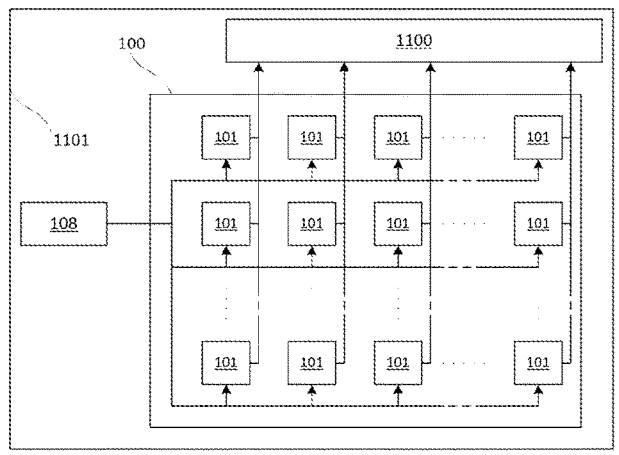
FIG. 11A illustrates a vision sensor according to a further embodiment of the present invention where the vision sensor comprises a readout circuit.
Figure 11B:
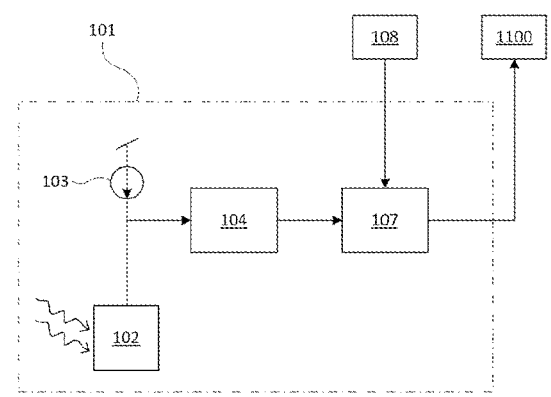
FIG. 11B illustrates the features of each pixel the array or pixels.

FIG. 11A illustrates a vision sensor 1101 according to a further embodiment of the present invention. The vision sensor 1101 in FIG. 11A-B has many of the same features as the vision sensor 1 in FIG. 1A and like features are awarded the same reference numbers. FIG. 11B illustrates the features of a pixel 101 in the pixel array 100 of the vision sensor 1011 of FIG. 11A; the pixel 101 has many of the same features as the pixel 101 shown in FIG. 1B and like features are awarded the same reference numbers. It will be understood that all of the pixels 101 in the pixel array 100 of the vision sensor 1101 of FIG. 11A have the configuration shown in FIG. 11B.

The vision sensor 1101 of FIG. 11A further comprises a readout circuit 1100 which is operable to read out counter values which have been stored in the respective storage means/memories 107 of the pixels 101 in the pixel array 101 to a processor (e.g. to the processor 204, when the vision sensor 1011 is used in a depth sensor 200 shown in FIG. 2A) as part of the readout phase. The readout circuit 1100 allows reading out (consecutively or simultaneously) all the counter values stored in all of the respective storage means/memories 107 of all of the pixels 101 in the pixel array.

When the vision sensor 1101 shown in FIG. 11A is used in the depth sensor 200 of FIG. 2A, the readout circuit 1100 may comprise a communication bus connecting the readout circuit 1100 to the processor 204. The communication bus may sequentially be connected to the respective storage means/memories 107 of the pixels 101 in the pixel array 101 of all pixels in the vision sensor, such that the content of the counter values stored in the respective storage means/memories 107 can be transmitted to the processor 204 over said communication bus.

Figure 12A:
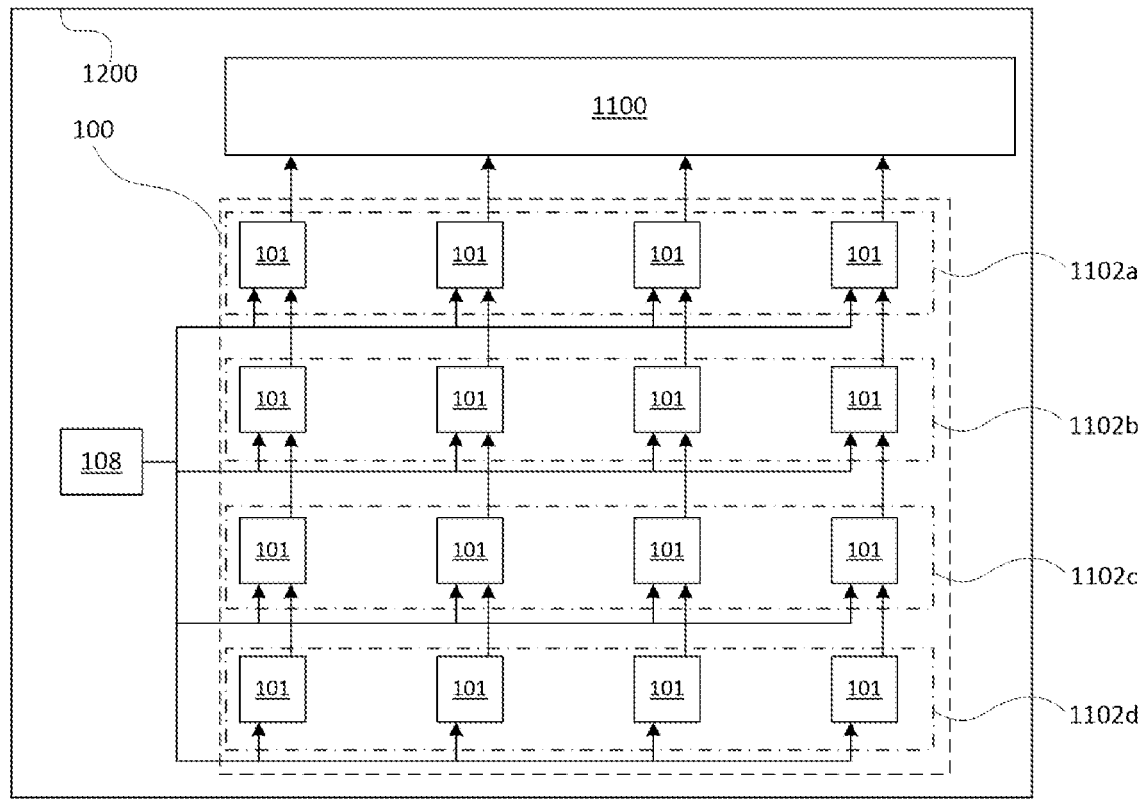
FIG. 12A illustrates a vision sensor according to a further embodiment of the present invention where the storage means of the pixels may be connected between adjacent pixels.

FIG. 12A illustrates a vision sensor 1200 according to a further embodiment of the present invention. The vision sensor 1200 in FIG. 12A-B has many of the same features as the vision sensor 1 in FIG. 1A and like features are awarded the same reference numbers.

Referring to FIG. 12A, the vision sensor 1200 further comprises a readout circuit 1100 which is operable to read out counter values which have been stored in the respective storage means/memories 107 of the pixels 101 in the pixel array 101 to a processor (e.g. to the processor 204, when the vision sensor 1200 is used in a depth sensor 200 shown in FIG. 2A) as part of the readout phase. In this example the readout circuit 1100 is configured to read out, simultaneously, all the counter values stored in all of the respective storage means/memories 107 of all of the pixels 101 positioned on the same row of the pixel array 100; the different rows of the pixel array 100 are read out consecutively. In other words, all the counter values stored in all of the respective storage means/memories 107 of all of the pixels 101 positioned on the first row 1102a of the pixel array 100 are read out simultaneously; then after all of the respective storage means/memories 107 of all of the pixels 101 positioned on the first row 1102a of the pixel array 100 are read out simultaneously, then all of the respective storage means/memories 107 of all of the pixels 101 positioned on the second row 1102b of the pixel array 100 are read out simultaneously; etc. until all of the storage means/memories 107 of all of the pixels 101 in all rows 1102a-b have been read out.

The memory/storage means 107 of each pixel 101 on the top row 1102a of the pixel array is directly connected to the readout circuit 1100. The memory/storage means 107 of each pixel 101 on a second row 1102b of the pixel array is connected to the memory/storage means 107 of a respective pixel 101 on the first row 1102a. The memory/storage means 107 of each pixel 101 on a third row 1102c of the pixel array is connected to the memory/storage means 107 of a respective pixel 101 on the second row 1102b. The memory/storage means 107 of each pixel 101 on a fourth row 1102d of the pixel array is connected to the memory/storage means 107 of a respective pixel 101 on the third row 1102c. Counter values stored in the memory/storage means 107 of pixels 101 on the second, third and fourth row 1102b-d can be passed to the along the rows to the memory/storage means 107 of pixels 101 on the first row 1102a and from there to the read out circuit 1100.

It should be understand that also the bottommost row could be connected to the readout circuit.

Figure 12B:
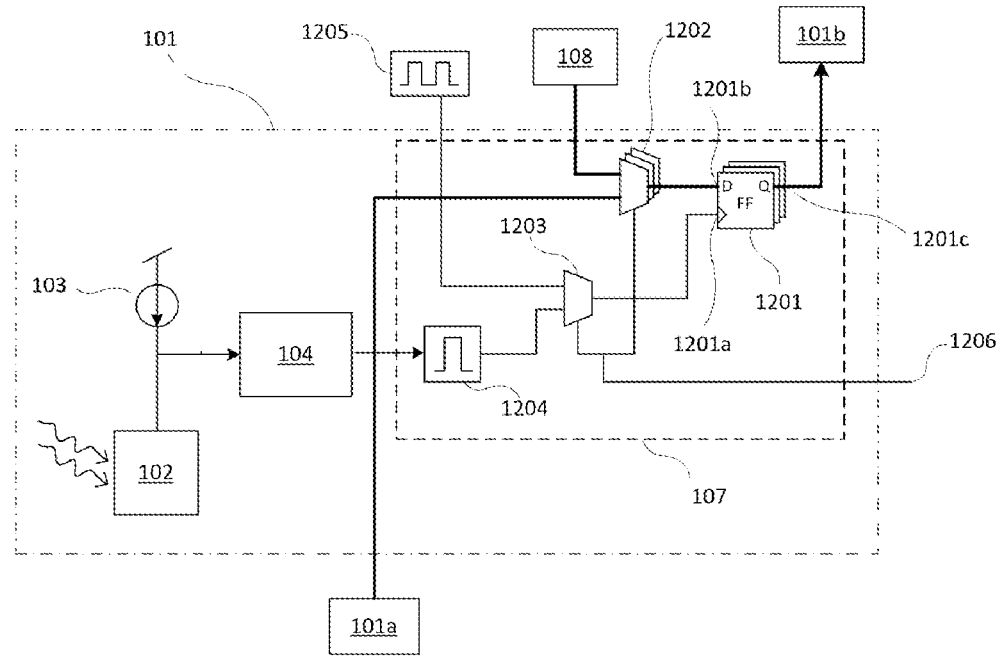
FIG. 12B illustrates the features of each pixel the array or pixels.

FIG. 12B shows a pixel 101 of the vision sensor 1200; it will be understood that all pixels 101 in the pixel array 100 of the vision sensor 1200 will be configured as shown in FIG. 12B. As shown in FIG. 12A, each pixel 101 is connected to a neighbouring pixel 101a which is located on a lower row of the pixel array, and to a neighbouring pixel 101b located on an upper row of the pixel array. It will be understood that those pixels located on the lower-most rows in the pixel array will only be connected to respective neighbouring pixels 101b located on a upper row of the pixel array and those pixels located on the upper-most rows in the pixel array will only be connected to respective neighbouring pixels 101b located on a lower row of the pixel array.

Referring to FIG. 12B, the memory/storage means 107 of each pixel is a set of Flip-Flops 1201, where the number of Flip-Flops per pixel equals the number of bits of the counter. The storage means also contains a set of multiplexers 1202, where the number of multiplexer per pixel is equal to the number of Flip-Flops per pixel. By means of the multiplexers 1202, the inputs 1201b of the Flip-Flops 1201 of a pixel can be selected to be either the output of the counter 108 or the output 1201c of the Flip-Flops of the pixel on the bottom. The multiplexers 1202 are controlled by a global control signal 1206.

The memory/storage means 107 also comprises a pulse generator 1204, that generates a voltage pulse when the output 104b of the integrator 104 indicates that the integral of the difference between the constant current output by the current source 103 and the current output by the photosensor 102 is equal to, or exceeded the predefined threshold. The storage means further comprises a multiplexer 1203. This multiplexer 1203 allows to either connect the output of the pulse generator 1204 to the clock input 1201a of the Flip-Flops 1201, or a global clock signal 1205. The multiplexer 1203 is controlled by the global control signal 1206.

During the integration phase, the set of multiplexers 1202 are configured so that the output of the counter 108 is connected to the input 1201b of the Flip-Flops 1201, and the multiplexer 1203 is configured so that the output of the pulse generator 1204 is connected to the clock input 1201a of the Flip-Flops 1201.

During the readout phase, the set of multiplexers 1202 are configured so that the output 1201c of the Flip-Flops of the neighbouring pixel is connected to the input 1201b of the Flip-Flops 1201, and the multiplexer 1203 is configured so that the global clock signal 1205 is connected to the clock input of the Flip-Flops 1201.

When the readout phase starts, the global clock signal 1205 is pulsed once (where a pulse means that the clock signal is initially logic low, the it is logic high for some time, and then it is logic low again). This copies the content of the Flip-Flops 1201 in the topmost row of pixels 1102a (i.e. the counter values which are stored in the memory/storage means 107 of the pixels in the top row 1102a of the pixel array 100) are to the readout circuit 1100, and copies the content of the Flip-Flops of the pixels in a row 1102b-d to the pixels in the row 1102a-c above it (e.g. copies the content of the Flip-Flops of the pixels in the second row 1102b to the pixels in the top row 1102a, and copies the content of the Flip-Flops of the pixels in the third row 1102c to the pixels in the second row 1102b, and copies the content of the Flip-Flops of the pixels in the fourth row 1102d to the pixels in the third row 1102c). When the vision sensor 1200 is used in a depth sensor such as the depth sensor 200 shown in FIG. 2A, then the counter values which have been passed from the memory/storage means 107 of the respective pixels in the top row 1102a to the read out circuit 1100 are sent from the read out circuit 1100 to the processor 204. Afterwards the clock signal is pulsed again. This again copies the content of the Flip-Flops 1201 in the topmost row of pixels 1102a to the readout circuit 1100, and copies the content of the Flip-Flops of the pixels in a row 1102b-d to the pixels in the row 1102a-c above it. And so on. In this way the content of the Flip-Flops i.e. the counter values which are stored in the memory/storage means 107 of the pixels in the respective rows 1102a-d of the pixel array 100 are moved along the rows of pixels to the read out circuit 1100; and after they reach the read out circuit the read out circuit 1100 passes the counter values to a processor. The above steps are repeated until the counter values which were originally stored in the memory/storage means 107 of the pixels in the lower most row 1102d of the pixel array 100 have been sent to the read out circuit 1100 via the pixels in the upper most row 1102a.

The Flip-Flops 1201 may additionally comprise a reset input that can be used to set the content of the Flip-Flops to a known value, for example at the start of the integration phase.

Figure 13A:
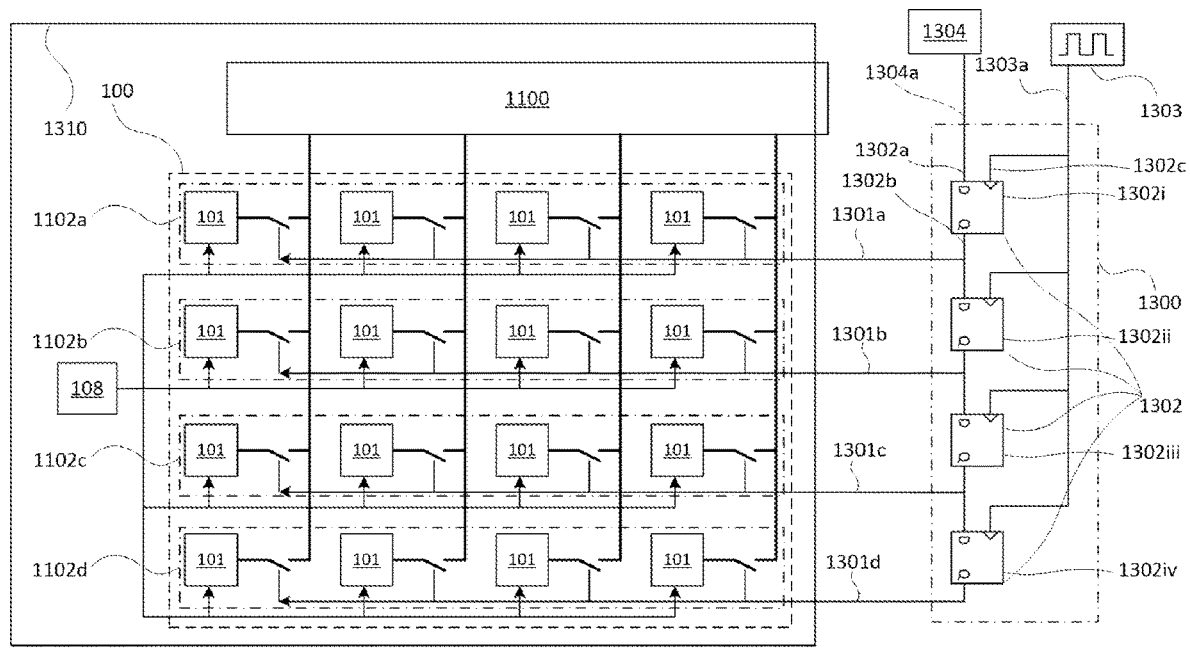
FIG. 13A illustrates a vision sensor according to a further embodiment of the present invention where the vision sensor comprises a readout circuit and a row selection circuit.
Figure 13B:
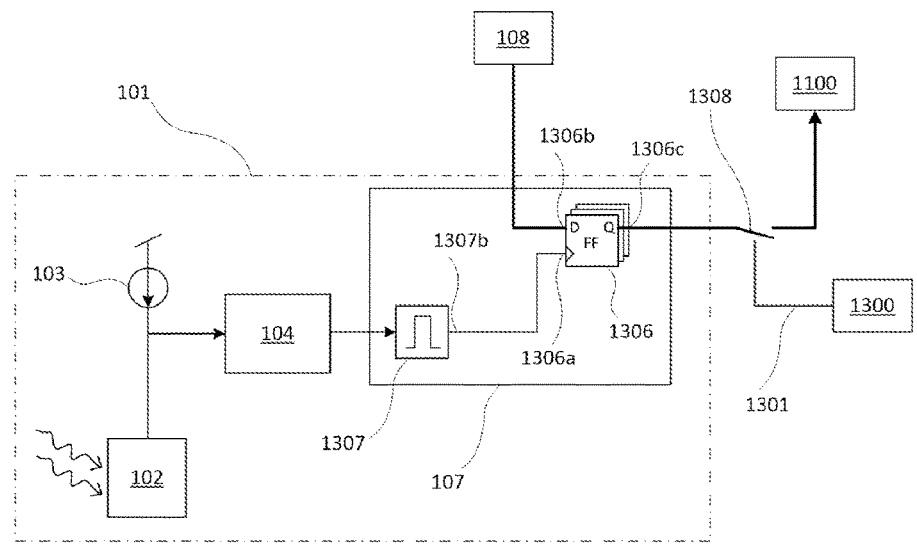
FIG. 13B illustrates the features of each pixel the array or pixels.

FIG. 13A-B illustrates a vision sensor 1310 according to a further embodiment of the present invention. The vision sensor 1310 in FIG. 13A-B has many of the same features as the vision sensor 1200 in FIG. 12A-B and like features are awarded the same reference numbers.

Referring to FIG. 13A, the vision sensor 1310 comprises a row selection circuit 1300 having an plurality of row select lines 1301a-d each line being connected to all of the pixels in a respective row 1102a-d of the pixel array 100. The row select circuit can selectively provide a signal along a row select line 1301a-d which causes all of the pixels of that row to be connected to the readout circuit 1100 so that the counter values stored in the storage means/memory 107 of that pixel can be passed to the read out circuit 1100. Specifically each pixel has a switch 1308 which can selectively be closed to connect that pixel to the read out circuit; each row select lines 1301a-d operates the switches belonging to a the pixels of a respective row 1102a-d; when the row select circuit passes a signal along a particular row select line 1301a-d then the signal will cause all of the switches of all of the pixels in that row to close thus connecting each pixel of that row to the read out circuit 1100, so that all of the counter values stored in the respective storage means/memories 107 of the pixels in that row are passed to the read out circuit 1100. At any given instant in time, at most one of the row selection signal 1301 is active i.e. only one row of pixels 1102a-d of pixels are connected to the read out circuit 1100 at any one time.

The row selection circuit 1300 comprises a shift register comprising a plurality of Flip-Flops 1302; wherein the number of Flip-Flops corresponds to the number of rows in the pixel array 100. Each Flip-Flop 1302 comprises an input 1302a and an output 1302b. The output 1302b of a Flip-Flop 1302 is connected to a respective row select line 1301a-d.

The input 1302a of a first Flip-Flop 1302i is connected to a control signal line 1304a (a control signal can be passed from along the control signal line 1304a to be received at the input 1302a of a first flip flop 1302i); the output 1302b of a first Flip-Flop 1302i is connected to the a first row select line 1301a; the output 1302a of a first Flip-Flop 1302i is also connected to the input 1302a of a second flip flop 1302ii. The output 1302a of the second Flip-Flop 1302ii is connected to a second row select line 1301b and it also connected to the input 1302a of a third flip flop 1302iii. The output 1302a of the third Flip-Flop 1302iii is connected to a third row select line 1301c and it also connected to the input 1302a of a fourth flip flop 1302iv. The output 1302a of the fourth flip-Flop 1302iv is connected to a fourth row select line 1301d.

A signal output by the first Flip-Flop 1302i defines a first row select signal, and this first row select signal is passed from the output 1302a of the first Flip-Flop 1302i along the first row select line 1301a; the first row select signal closes all of the switches of all of the pixels in the first row 1102a thus connecting each pixel of that row to the read out circuit 1100, so that all of the counter values stored in the respective storage means/memories 107 of the pixels in the first row 1102a are passed to the read out circuit 1100.

A signal output by the second Flip-Flop 1302ii defines a second row select signal, and this second row select signal is passed from the output 1302a of the second Flip-Flop 1302ii along the second row select line 1301b: the second row select signal closes all of the switches of all of the pixels in the second row 1102b thus connecting each pixel of that row to the read out circuit 1100, so that all of the counter values stored in the respective storage means/memories 107 of the pixels in the second row 1102b are passed to the read out circuit 1100.

A signal output by the third Flip-Flop 1302iii defines a third row select signal, and this third row select signal is passed from the output 1302a of the third Flip-Flop 1302iii along the third row select line 1301c; the third row select signal closes all of the switches of all of the pixels in the third row 1102c thus connecting each pixel of that row to the read out circuit 1100, so that all of the counter values stored in the respective storage means/memories 107 of the pixels in the third row 1102c are passed to the read out circuit 1100.

A signal output by the fourth Flip-Flop 1302iv defines a fourth row select signal, and this fourth row select signal is passed from the output 1302a of the fourth Flip-Flop 1302iv along the fourth row select line 1301d; the fourth row select signal closes all of the switches of all of the pixels in the fourth row 1102d thus connecting each pixel of that row to the read out circuit 1100, so that all of the counter values stored in the respective storage means/memories 107 of the pixels in the fourth row 1102d are passed to the read out circuit 1100.

Each of the flip flops 1302i-iv have their clock input 1302c connected to a row clock line 1303a which is connected to a clock 1303; the clock 1303 can generate a clock signal (referred to hereafter as a row clock signal) which is sent along the row clock line 1303a to the clock inputs 1302c of the flip flops 1302i-iv. The first Flip-Flop 1302i has its input 1302a connected to a control signal line 1304a which is connected to a controller 1304. In case the vision sensor is used in a depth sensor such as shown in FIG. 2A-B, the controller may be the processor. The controller can generate a control signal which is sent along control line 1304a to the input 1302a of the flip flops 1302i-iv. The processor 204 may define the controller 1304; in other words the processor 204 may be configured to generate a control signal which is sent along control line 1304a to the input 1302a of the flip flops 1302i-iv.

It is assumed that before the readout phase, all Flip-Flops 1302i-iv have a logic low stored in them. At the start of the readout phase, the controller 1304 sends a logic high control signal along the signal line 1304a to the input of the first Flip-Flop 1302i, and afterwards, the clock 1303 is pulsed once to provide a clock pulse signal (i.e. the clock pulse signal is a sequence consisting of logic low, then logic high for some time, and then back to logic low), which sends a pulse along the row clock line 1303a to all the clock inputs 1302c of all the Flip-Flops 1302i-iv. Now the first Flip-Flop 1302i will have a logic high stored in it, while all the other Flip-Flops 1302ii-iv will have a logic low stored in them. The logic high stored in the first Flip-Flop 1302i means that the output 1302b of the first Flip-Flop 1302i is logic high and the first row select signal 1301a is active. This first row select signal is passed from the output 1302a of the first Flip-Flop 1302i along the first row select line 1301a; the first row select signal closes all of the switches of all of the pixels in the first row 1102a and the counter values which are stored in the respective memories/storage means 107 of all of the pixels in the first row 1102a are passed to the read out circuit 1100. The read out circuit 1100 will then read out the respective counter values to a processor (such as the processor 204 in FIG. 2A).

When the readout circuit 1100 has finished reading out the memory content of the pixels in the first row 1102a, the controller 1304 will send a logic low control signal, along control line 1304a to the input of the first Flip-Flop 1302i, and the clock 1303 sends a clock signal, in the form of a single pulse (which comprises a sequence consisting of logic low, then logic high and then again logic low), along the row clock line 1303a. Now the second Flip-Flop 1302ii will have a logic high stored in it, while all the other Flip-Flops 1302i,iii,iv will have a logic low stored in them. The logic high stored in the second Flip-Flop 1302ii means that the output 1302b of the second Flip-Flop is logic high and the second row select signal 1301b is active. This second row select signal is passed from the output 1302b of the second Flip-Flop 1302ii along the second row select line 1301b; the second row select signal closes all of the switches of all of the pixels in the second row 1102b and the counter values which are stored in the respective memories/storage means 107 of all of the pixels in the second row 1102b are passed to the read out circuit 1100. The read out circuit 1100 will then read out the respective counter values to a processor (such as the processor 204 in FIG. 2A).

When the readout circuit 1100 has finished reading the memory content of the pixels in the second row 1102b, the controller 1304 will send logic low control signal, along control line 1304a, and the clock 1303 sends a clock signal, in the form of a single pulse (which comprises a sequence consisting of logic low, then logic high and then again logic low), along the row clock line 1303a. Now the third Flip-Flop 1302iii will have a logic high stored in it, while all the other Flip-Flops 1302i,ii,iv will have a logic low stored in them. The logic high stored in the third Flip-Flop means that the output 1302b of the third Flip-Flop is logic high and the third row select signal 1301c is active. This third row select signal is passed from the output 1302a of the third Flip-Flop 1302iii along the third row select line 1301c; the third row select signal closes all of the switches of all of the pixels in the third row 1102c and the counter values which are stored in the respective memories/storage means 107 of all of the pixels in the third row 1102c are passed to the read out circuit 1100. The read out circuit 1100 will then read out the respective counter values to a processor (such as the processor 204 in FIG. 2A).

When the readout circuit 1100 has finished reading the memory content of the pixels in the third row 1102c, the controller 1304 will send a logic low control signal, along control line 1304a, and the clock 1303 sends a clock signal, in the form of a single pulse (which comprises a sequence consisting of logic low, then logic high and then again logic low), along the row clock line 1303a. Now the fourth Flip-Flop 1302iv will have a logic high stored in it, while all the other Flip-Flops will have a logic low stored in them. The logic high stored in the fourth Flip-Flop means that the output 1302b of the fourth Flip-Flop is logic high and the fourth row select signal 1301c is active. This fourth row select signal is passed from the output 1302a of the fourth Flip-Flop 1302iv along the fourth row select line 1301c; the fourth row select signal closes all of the switches of all of the pixels in the fourth row 1102d and the counter values which are stored in the respective memories/storage means 107 of all of the pixels in the fourth row 1102d are passed to the read out circuit 1100. The read out circuit 1100 will then read out the respective counter values to a processor (such as the processor 204 in FIG. 2A).

When the readout circuit 1100 has finished reading the memory content of the pixels in the fourth row 1102d, controller 1304 will send a logic low control signal, along control line 1304a, and the clock 1303 sends a clock signal, in the form of a single pulse, along the row clock line 1303a. The readout phase has finished, and all Flip-Flops 1302i-iv have again a logic low stored in them.

Referring to FIG. 13B there is illustrated the pixel storage/memory 107, which comprises a set of Flip-Flops 1306, where the number of Flip-Flops per pixel is equal to the number of bits in the counter 108; and a pulse generator circuit 1307 that provides a voltage pulse at an output 1307b of the pulse generator circuit 1307 when integral of difference between constant current output by the photosensor 102 and current output by the current source 103 reaches the predefined threshold (as indicated by the integrator 104). The output 1307b of the pulse generator circuit 1307 is connected to the clock input 1306a of the Flip-Flops 1306. The input 1306b of the Flip-Flops is connected to the counter 108. The outputs 1306c of the Flip-Flops are selectively connected to the readout circuit 1100 by a set of switches 1308 controlled by the row selection circuit 1300.

The Flip-Flops 1306 may additionally comprise a reset input that can be used to set the content of the Flip-Flops to a known value, for example at the start of the integration phase.

Figure 14:
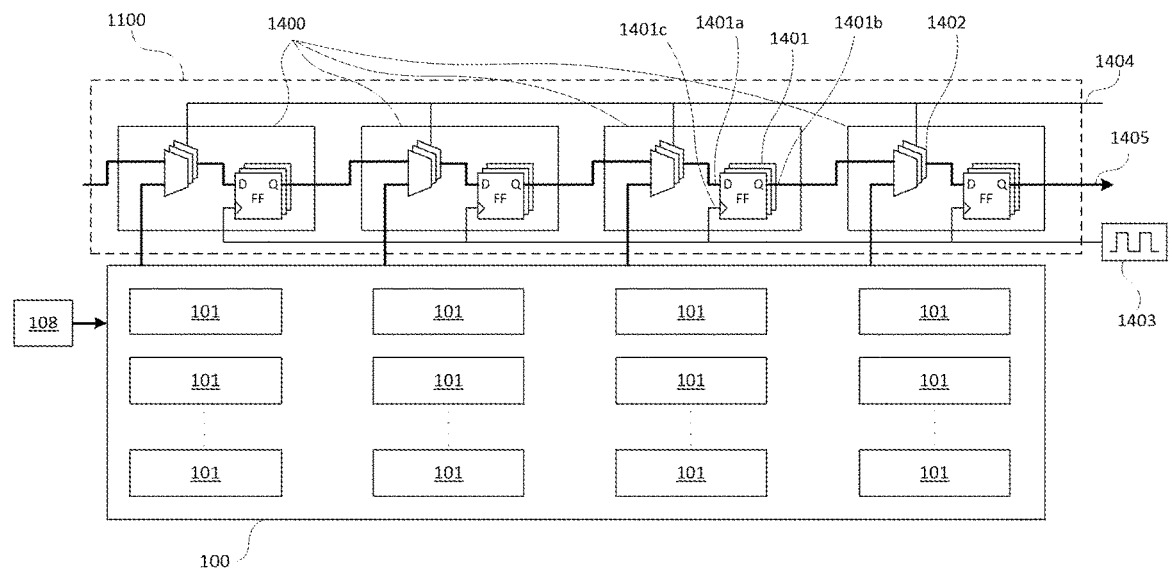
FIG. 14 illustrates an exemplary configuration of a readout circuit.

The readout circuit may take any suitable confirmation. FIG. 14 shows one exemplary implementation for the readout circuit.

Referring to FIG. 14 the readout circuit 1100 comprises one column circuit 1400 for each column of pixels 101 in the pixel array 100.

Each column circuit 1400 comprises a set of Flip-Flops 1401, where the number of Flip-Flops per column-circuit is equal to the number of bits in the counter 108 and a set of multiplexers 1402 that allows connecting the input 1401a of the Flip-Flops of a column circuit either to the output 1401b of Flip-Flops of the previous column circuit or to the storage means of a pixel 101 in the corresponding column. The multiplexers 1402 are controlled by a control signal 1404. The clock inputs 1401c of the Flip-Flops are connected to a column clock signal 1403. The output of the last (rightmost in FIG. 14) column circuit forms the output 1405 of the readout circuit.

If the vision sensor is used in a depth sensor such as in FIG. 2A, the output 1405 of the readout circuit is connected to the processor 204.

The vision sensor embodiment shown in FIGS. 12A-B, 13A-B and 14 are illustrated as comprising four rows and four columns of pixels; however, it should be understood that the pixel array may have any suitable number of rows and columns of pixels.

Figure 15A:
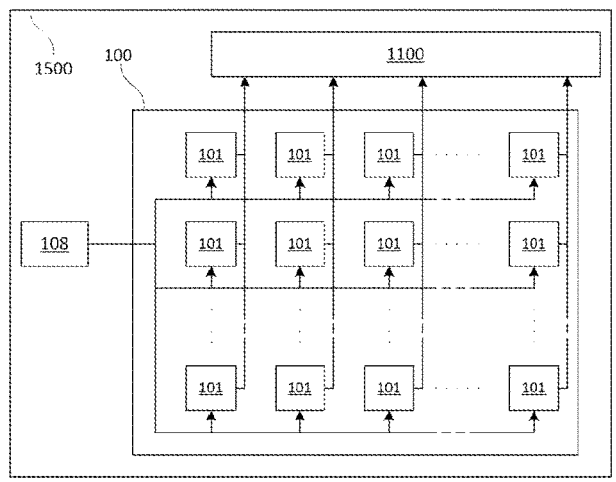
FIG. 15A illustrates a vision sensor according to a further embodiment of the present.
Figure 15B:
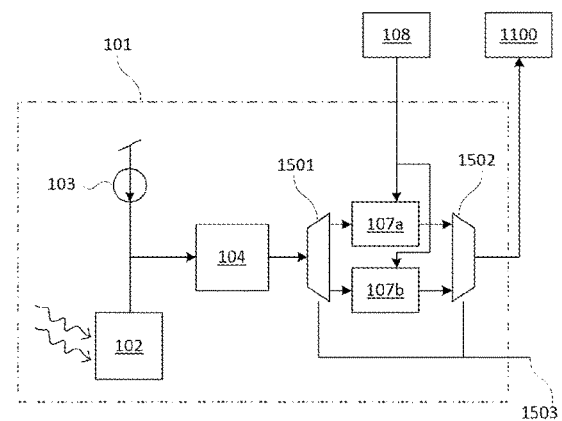
FIG. 15B illustrates the features of each pixel the array or pixels, where each pixel comprises two memories.

FIG. 15A illustrates a vision sensor 1500 according to a further embodiment of the present invention. The vision sensor 1500 in FIG. 15A-B has many of the same features as the vision sensor 1011 in FIG. 11A-B and like features are awarded the same reference numbers. FIG. 15B illustrates a pixel 101 used in the vision sensor 1500; it will be understood that all of the pixels 101 in the pixel array of the vision sensor 1500 will be configured as is illustrated in FIG. 15B.

Referring to FIG. 15B, each pixel 101 in the vision sensor 1500 shown in FIG. 15A contains two memories 107a and 107b, a demultiplexer 1501 and a multiplexer 1502. The demultiplexer 1501 allows connecting the output of the integrator 104 either to the first memory 107a or to the second memory 107b. The multiplexer 1502 allows to selectively connect either the first memory 107a or the second memory 107b to the readout circuit 1100. The demultiplexer and the multiplexer are controlled by a control signal 1503. The pixel shown in FIG. 15B may allow the readout phase of a frame to happen during the integration phase of the next frame. One memory instance (for example 107a) is connected to integrator and ready to store the output of the counter 108, and the other instance of the memory (in this example 107b) is connected to the readout circuit. After the memories 107b of all pixels are read out and the integration phase is finished, the connections of the memories are inversed; meaning the memory that was previously connected to the integrator is now connected to the readout circuit, while the memory that was connected to the readout circuit is now connected to the integrator.

If even more memory instances are added to each pixel, the sensor may gather data for multiple frames before reading out the counter value data stored in the memories.

FIG. 16A illustrates a vision sensor 1600 according to a further embodiment of the present invention. The vision sensor 1600 in FIG. 16A-B has many of the same features as the vision sensor in FIG. 11A-B and like features are awarded the same reference numbers. FIG. 16B illustrates a pixel 101 used in the vision sensor 1600; it will be understood that all of the pixels 101 in the pixel array of the vision sensor 1600 will be configured as is illustrated in FIG. 16B.

Referring to FIG. 16B each pixel contains multiple pixel storage memories (the pixel 101 shown in FIG. 16B comprises three memories 107a, 107b, 107c, but it should be understood that any suitable number of memories can be used) to allow recording the time instances of multiple threshold crossings per frame. Each pixel also contains a demultiplexer 1601 that connects one of the instances of the memory to the integrator. The demultiplexer is configured such that if the integrator output 104b signals that the integral of the difference between the constant current output by the current source 103 and the current output by the photosensor 102 is equal to, or exceeds, the predefined threshold, a counter value is stored in one of the memories, and afterwards the demultiplexer automatically connects the next instance of the memories to the integrator. Each pixel also contains a multiplexer 1602 that allows to selectively connect one instance of the memories to the readout circuit 1100. The multiplexer is controlled by a control signal 1603.

Each time the integration of the difference between the current output by the photosensor 102 and the current source 103 crosses the predefined threshold, the output of the counter 108 is stored in one of the memory instances, the pixel resets itself (new sampling of background illumination by configuring the current source 103 to output a constant current equal to the current output by the photosensor 102 at this instant) and another instance of the memory is connected to the integrator by means of the demultiplexer. Then the integrator again integrates the difference between the output of the photosensor and the current source, and if the predefined threshold is crossed again, the counter value is stored in the instance of the memory that is now connected to the integrator.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

What is claimed is:

1. A depth sensor assembly comprising,
a projector that projects a light pattern onto a scene; and
a camera comprising:
  a vision sensor including an array of pixels in which each pixel samples background illumination from the scene and measures a difference between the sampled background illumination and a current illumination of the pixel from the scene including the light pattern, and
  a processor that determines a depth value of the pixel to the scene based on the difference between the sampled background illumination and the current illumination of said pixel reaches a threshold level and generates a depth map using the determined depth values for the pixels.

2. The assembly as claimed in claim 1, wherein the projected light pattern includes one or more lines and/or a random dot pattern.

3. The assembly as claimed in claim 1, wherein the projected pattern includes a series of patterns.

4. The assembly as claimed in claim 3, wherein the series of patterns ensure that every point on a surface in the scene will receive a light ray at some point in time.

5. The assembly as claimed in claim 1, wherein the vision sensor detects changes in light intensity relative to the background illumination, at a high time resolution and generates an indication of a time when the changes in light intensity occurred for each of the pixels.

6. The assembly as claimed in claim 1, wherein each of the pixels records a time instant when an integration value of that respective pixel reaches the threshold level.

7. The assembly as claimed in claim 1, wherein each of the pixels comprises a photosensor and an integrator that integrates difference between current output and a previous output.

8. The assembly as claimed in claim 7, wherein the integrator comprises an amplifier and a capacitor.

9. A method of operation of a depth sensor, the method comprising,
projecting a light pattern onto a scene;
detecting light from the scene with an array of pixels in which each of the pixels samples background illumination from the scene and measures a difference between the sampled background illumination and a current illumination of the pixels from the scene including the light pattern;
determining a depth value of the pixels to the scene based on the difference between the sampled background illumination and the current illumination and a threshold level; and
generating a depth map using the determined depth value of the array of pixels.

10. The method as claimed in claim 9, wherein the step of projecting the light pattern comprises projecting several lines.

11. The method as claimed in claim 9, wherein the step of projecting the light pattern comprises projecting several random dot patterns.

12. The method as claimed in claim 9, wherein the step of projecting the light pattern comprises projecting series of patterns.

13. The method as claimed in claim 12, wherein the series of patterns covers every point on a surface in the scene.

14. The method as claimed in claim 9, further comprising:
    detecting changes in light intensity relative to the background illumination, at a high time resolution; and
    generating an indication of a time when the changes in light intensity occurred for each of the pixels.

15. The method as claimed in claim 9, further comprising recording a time instant when an integration value of respective pixels reaches the threshold level.

16. The method as claimed in claim 9, wherein each of the pixels comprises a photosensor and an integrator that integrates the difference between current output and a previous output.

17. The method as claimed in claim 16, wherein the integrator comprises an amplifier and a capacitor.

* * * * *